United States Patent
Elshafie et al.

(10) Patent No.: US 12,519,580 B2
(45) Date of Patent: Jan. 6, 2026

(54) UPLINK CONTROL INFORMATION REPORTING

(71) Applicant: QUALCOMM Incorporated, San Diego, CA (US)

(72) Inventors: Ahmed Elshafie, San Diego, CA (US); Wei Yang, San Diego, CA (US); Yi Huang, San Diego, CA (US); Hwan Joon Kwon, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 68 days.

(21) Appl. No.: 17/446,889

(22) Filed: Sep. 3, 2021

(65) Prior Publication Data

US 2022/0109534 A1    Apr. 7, 2022

Related U.S. Application Data

(60) Provisional application No. 63/198,211, filed on Oct. 2, 2020.

(51) Int. Cl.
    *H04L 5/00* (2006.01)
(52) U.S. Cl.
    CPC .................. *H04L 5/0005* (2013.01)
(58) Field of Classification Search
    CPC ... H04L 5/0005; H04L 5/0021; H04L 5/0055; H04L 5/0057; H04L 5/0064; H04L 5/0053
    See application file for complete search history.

(56) References Cited

U.S. PATENT DOCUMENTS

| | | | | |
|---|---|---|---|---|
| 11,337,188 B2* | 5/2022 | Oh | ........................ | H04W 4/70 |
| 11,497,036 B2* | 11/2022 | Xue | .................... | H04W 72/121 |
| 2013/0242886 A1* | 9/2013 | Chen | .................... | H04L 5/1469 370/329 |
| 2014/0029532 A1* | 1/2014 | Han | ........................ | H04L 67/51 370/329 |
| 2014/0050165 A1* | 2/2014 | Park | ..................... | H04L 1/1861 370/329 |
| 2014/0233419 A1* | 8/2014 | Cheng | ................. | H04W 72/542 370/252 |
| 2015/0319776 A1* | 11/2015 | Seo | ........................ | H04L 1/1822 370/329 |
| 2016/0095104 A1* | 3/2016 | Chen | ..................... | H04L 5/0048 370/329 |

(Continued)

FOREIGN PATENT DOCUMENTS

WO    2020032690 A1    2/2020

OTHER PUBLICATIONS

International Search Report and Written Opinion—PCT/US2021/071380—ISA/EPO—Dec. 14, 2021.

*Primary Examiner* — Liem H. Nguyen
*Assistant Examiner* — Wilfred Thomas
(74) *Attorney, Agent, or Firm* — Harrity & Harrity, LLP

(57) ABSTRACT

Various aspects of the present disclosure generally relate to wireless communication. In some aspects, a mobile station may transmit, from the mobile station to a base station, first uplink control information (UCI) associated with a first UCI stage using a time-frequency resource of a slot. The mobile station may transmit, from the mobile station to the base station, second UCI associated with a second UCI stage using the time-frequency resource of the slot. Numerous other aspects are provided.

24 Claims, 16 Drawing Sheets

900 ⟶

(56) References Cited

U.S. PATENT DOCUMENTS

| | | | |
|---|---|---|---|
| 2017/0155488 A1* | 6/2017 | Saxena | H04W 72/0446 |
| 2017/0223694 A1* | 8/2017 | Han | H04W 52/281 |
| 2018/0198569 A1* | 7/2018 | Lyu | H04W 72/21 |
| 2018/0255544 A1* | 9/2018 | Xiao | H04L 1/1671 |
| 2018/0338339 A1* | 11/2018 | Song | H04L 5/0053 |
| 2019/0068423 A1* | 2/2019 | Hwang | H04L 27/2613 |
| 2019/0069321 A1 | 2/2019 | Akkarakaran et al. | |
| 2019/0150097 A1 | 5/2019 | Seo et al. | |
| 2019/0229863 A1* | 7/2019 | Lei | H04W 72/21 |
| 2019/0268901 A1* | 8/2019 | Park | H04L 5/00 |
| 2019/0349919 A1* | 11/2019 | Oh | H04L 1/0011 |
| 2019/0349923 A1* | 11/2019 | Shao | H04W 72/04 |
| 2019/0350048 A1* | 11/2019 | Kim | H04W 72/1263 |
| 2020/0037259 A1* | 1/2020 | Choi | H04L 5/0007 |
| 2020/0092876 A1* | 3/2020 | Cho | H04W 72/21 |
| 2020/0136690 A1* | 4/2020 | Noh | H04L 5/0094 |
| 2020/0245319 A1* | 7/2020 | Chen | H04L 5/0053 |
| 2020/0367252 A1* | 11/2020 | Hebron | H04L 5/0007 |
| 2020/0404652 A1* | 12/2020 | Matsumura | H04W 72/23 |
| 2021/0022129 A1* | 1/2021 | Yuan | H04L 1/1812 |
| 2021/0105812 A1* | 4/2021 | Rastegardoost | H04W 74/0808 |
| 2021/0144763 A1* | 5/2021 | Park | H04W 72/0446 |
| 2021/0160901 A1* | 5/2021 | Takeda | H04L 5/0053 |
| 2021/0195620 A1* | 6/2021 | Yoshimura | H04W 72/1273 |
| 2021/0226748 A1* | 7/2021 | Frenne | H04L 25/0204 |
| 2021/0307036 A1* | 9/2021 | Myung | H04W 72/1268 |
| 2022/0109527 A1* | 4/2022 | Hwang | H04L 1/1864 |
| 2022/0109535 A1* | 4/2022 | Kim | H04L 5/0044 |
| 2022/0150905 A1* | 5/2022 | Shimezawa | H04W 72/56 |
| 2022/0174699 A1* | 6/2022 | El Hamss | H04W 72/1268 |
| 2022/0225313 A1* | 7/2022 | Kalhan | H04W 72/044 |
| 2022/0286972 A1* | 9/2022 | Miao | H04W 72/044 |
| 2022/0294881 A1* | 9/2022 | Vieira | G05B 19/4185 |
| 2023/0006798 A1* | 1/2023 | Lee | H04L 5/0055 |
| 2023/0171716 A1* | 6/2023 | He | H04L 5/0053 370/503 |
| 2023/0283437 A1* | 9/2023 | Liang | H04L 5/0053 370/329 |
| 2023/0318748 A1* | 10/2023 | Yin | H04L 1/1854 370/329 |

\* cited by examiner

UPLINK CONTROL INFORMATION REPORTING

CROSS-REFERENCE TO RELATED APPLICATION

This Patent Application claims priority to U.S. Provisional Patent Application No. 63/198,211, filed on Oct. 2, 2020, entitled "UPLINK CONTROL INFORMATION REPORTING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink control information reporting.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes transmitting, from the mobile station to a base station, first uplink control information (UCI) associated with a first UCI stage using a time-frequency resource of a slot; and transmitting, from the mobile station to the base station, second UCI associated with a second UCI stage using the time-frequency resource of the slot.

In some aspects, a method of wireless communication performed by a mobile station includes transmitting, from the mobile station to a base station, first UCI associated with a first UCI stage using a first quantity of resource blocks in a slot; and transmitting, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, a method of wireless communication performed by a base station includes receiving, at the base station from a mobile station, first UCI associated with a first UCI stage using a time-frequency resource of a slot; and receiving, at the base station from the mobile station, second UCI associated with a second UCI stage using the time-frequency resource of the slot.

In some aspects, a method of wireless communication performed by a base station includes receiving, at the base station from a mobile station, first UCI associated with a first UCI stage using a first quantity of resource blocks in a slot; and receiving, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, a mobile station for wireless communication includes a memory and one or more processors coupled to the memory, the one or more processors configured to: transmit, from the mobile station to a base station, first UCI associated with a first UCI stage using a time-frequency resource of a slot; and transmit, from the mobile station to the base station, second UCI associated with a second UCI stage using the time-frequency resource of the slot.

In some aspects, a mobile station for wireless communication includes a memory and one or more processors coupled to the memory, the one or more processors configured to: transmit, from the mobile station to a base station, first UCI associated with a first UCI stage using a first quantity of resource blocks in a slot; and transmit, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, a base station for wireless communication includes a memory and one or more processors coupled to the memory, the one or more processors configured to: receive, at the base station from a mobile station, first UCI associated with a first UCI stage using a time-frequency resource of a slot; and receive, at the base station from the mobile station, second UCI associated with a second UCI stage using the time-frequency resource of the slot.

In some aspects, a base station for wireless communication includes a memory and one or more processors coupled to the memory, the one or more processors configured to: receive, at the base station from a mobile station, first UCI associated with a first UCI stage using a first quantity of resource blocks in a slot; and receive, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, a non-transitory computer-readable medium storing a set of instructions for wireless communication includes one or more instructions that, when executed by one or more processors of a mobile station, cause the mobile station to: transmit, from the mobile station to a base station, first UCI associated with a first UCI stage using a time-frequency resource of a slot; and transmit, from the mobile station to the base station, second UCI associated with a second UCI stage using the time-frequency resource of the slot.

In some aspects, a non-transitory computer-readable medium storing a set of instructions for wireless communication includes one or more instructions that, when executed by one or more processors of a mobile station, cause the mobile station to: transmit, from the mobile station to a base station, first UCI associated with a first UCI stage using a first quantity of resource blocks in a slot; and transmit, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, a non-transitory computer-readable medium storing a set of instructions for wireless communication includes one or more instructions that, when executed by one or more processors of a base station, cause the base station to: receive, at the base station from a mobile station, first UCI associated with a first UCI stage using a time-frequency resource of a slot; and receive, at the base station from the mobile station, second UCI associated with a second UCI stage using the time-frequency resource of the slot.

In some aspects, a non-transitory computer-readable medium storing a set of instructions for wireless communication includes one or more instructions that, when executed by one or more processors of a base station, cause the base station to: receive, at the base station from a mobile station, first UCI associated with a first UCI stage using a first quantity of resource blocks in a slot; and receive, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, an apparatus for wireless communication includes means for transmitting, from the apparatus to a base station, first UCI associated with a first UCI stage using a time-frequency resource of a slot; and means for transmitting, from the apparatus to the base station, second UCI associated with a second UCI stage using the time-frequency resource of the slot.

In some aspects, an apparatus for wireless communication includes means for transmitting, from the apparatus to a base station, first UCI associated with a first UCI stage using a first quantity of resource blocks in a slot; and means for transmitting, from the apparatus to the base station, second UCI associated with a second UCI stage using a second quantity of resource blocks in the slot that is separated in a time domain from the first quantity of resource blocks, wherein the first quantity of resource blocks is equal to the second quantity of resource blocks.

In some aspects, an apparatus for wireless communication includes means for receiving, at the apparatus from a mobile station, first UCI associated with a first UCI stage using a time-frequency resource of a slot; and means for receiving, at the apparatus from the mobile station, second UCI associated with a second UCI stage using the time-frequency resource of the slot.

In some aspects, an apparatus for wireless communication includes means for receiving, at the apparatus from a mobile station, first UCI associated with a first UCI stage using a first quantity of resource blocks in a slot; and means for receiving, at the apparatus from the mobile station, second UCI associated with a second UCI stage using a second quantity of resource blocks in the slot that is separated in a time domain from the first quantity of resource blocks, wherein the first quantity of resource blocks is equal to the second quantity of resource blocks.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
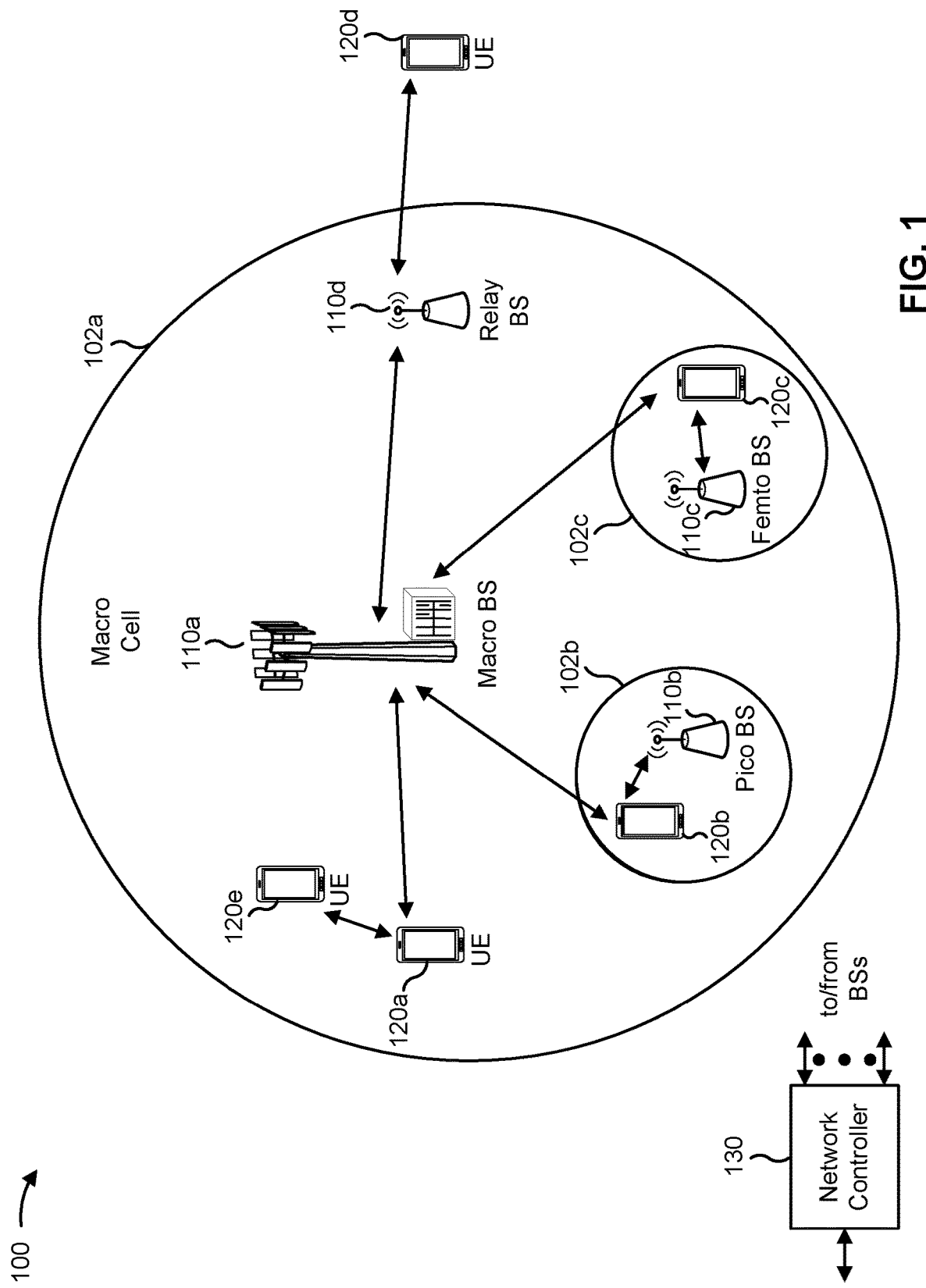
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
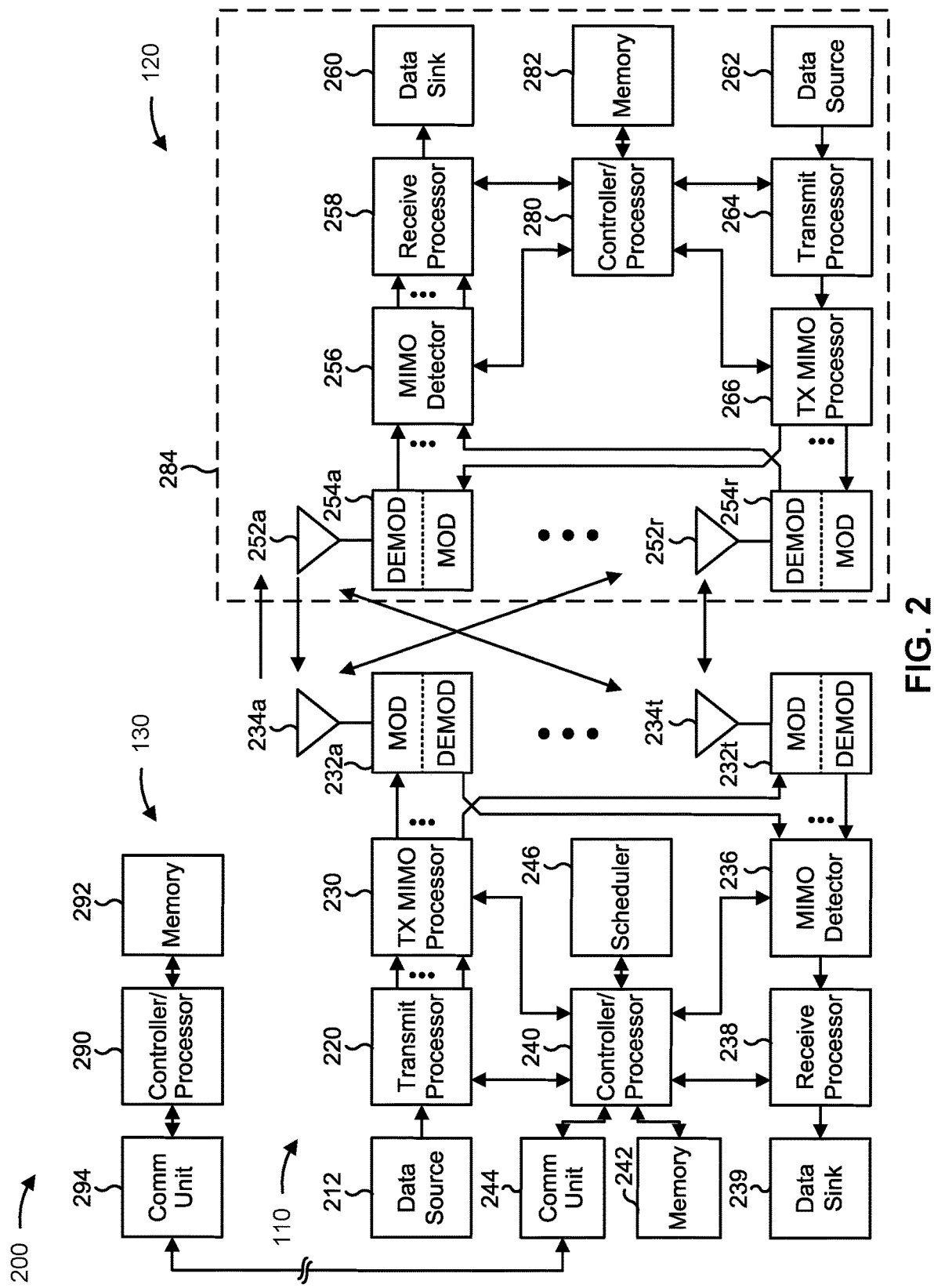
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with uplink control information (UCI) reporting, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a mobile station (e.g., UE 120) may include means for transmitting, from the mobile station to a base station, first UCI associated with a first UCI stage using a time-frequency resource of a slot, means for transmitting, from the mobile station to the base station, and/or second UCI associated with a second UCI stage using the time-frequency resource of the slot. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a mobile station (e.g., UE 120) may include means for transmitting, from the mobile station to a base station, first UCI associated with a first UCI stage using a first quantity of resource blocks in a slot, means for transmitting, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for receiving, at the base station from a mobile station, first UCI associated with a first UCI stage using a time-frequency resource of a slot, means for receiving, at the base station from the mobile station, and/or second UCI associated with a second UCI stage using the time-frequency resource of the slot. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, base station 110 may include means for receiving, at the base station from a mobile station, first UCI associated with a first UCI stage using a first quantity of resource blocks in a slot, means for receiving, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

A base station may schedule a mobile station (e.g., UE 120) to transmit an aperiodic channel state information (CSI) report on a physical uplink control channel (PUSCH). The base station may schedule the mobile station to transmit the aperiodic CSI report using an uplink grant. In other words, the base station may provide the uplink grant to the mobile station, and the mobile station may use the uplink grant to transmit the aperiodic CSI report via the PUSCH. The aperiodic CSI report may include a channel quality indicator, a precoding matrix indicator, and/or a rank indicator.

The aperiodic CSI report may increase a payload size of the PUSCH, which may affect a reliability of the aperiodic CSI report transmitted in the PUSCH. Further, the increased payload size of the PUSCH due to the aperiodic CSI report may affect a reliability of a hybrid automatic repeat request acknowledgement (HARQ-ACK) report or a HARQ acknowledgement-negative acknowledgement (ACK/NACK) report transmitted via the PUSCH. As a result, the mobile station may determine, based at least in part on a received signal quality, whether to transmit a soft ACK/NACK or a HARQ-ACK report, where the soft ACK/NACK may include HARQ-ACK, ACK/NACK, and/or CSI. A "soft" ACK/NACK may refer to CSI reporting along with ACK/NACK reporting. The soft ACK/NACK or the HARQ-ACK report may be transmitted as UCI from the mobile station. The mobile station may measure the received signal quality based at least in part on a received signal-to-interference-plus-noise ratio, an estimated spectral efficiency, an estimated interference, an observed block error rate, an observed bit error rate, and/or a log likelihood ratio quality with a cyclic redundancy check. Depending on whether the received signal quality is favorable or not favorable, the UE may determine whether to transmit the soft ACK/NACK or the HARQ-ACK report.

Figure 3:
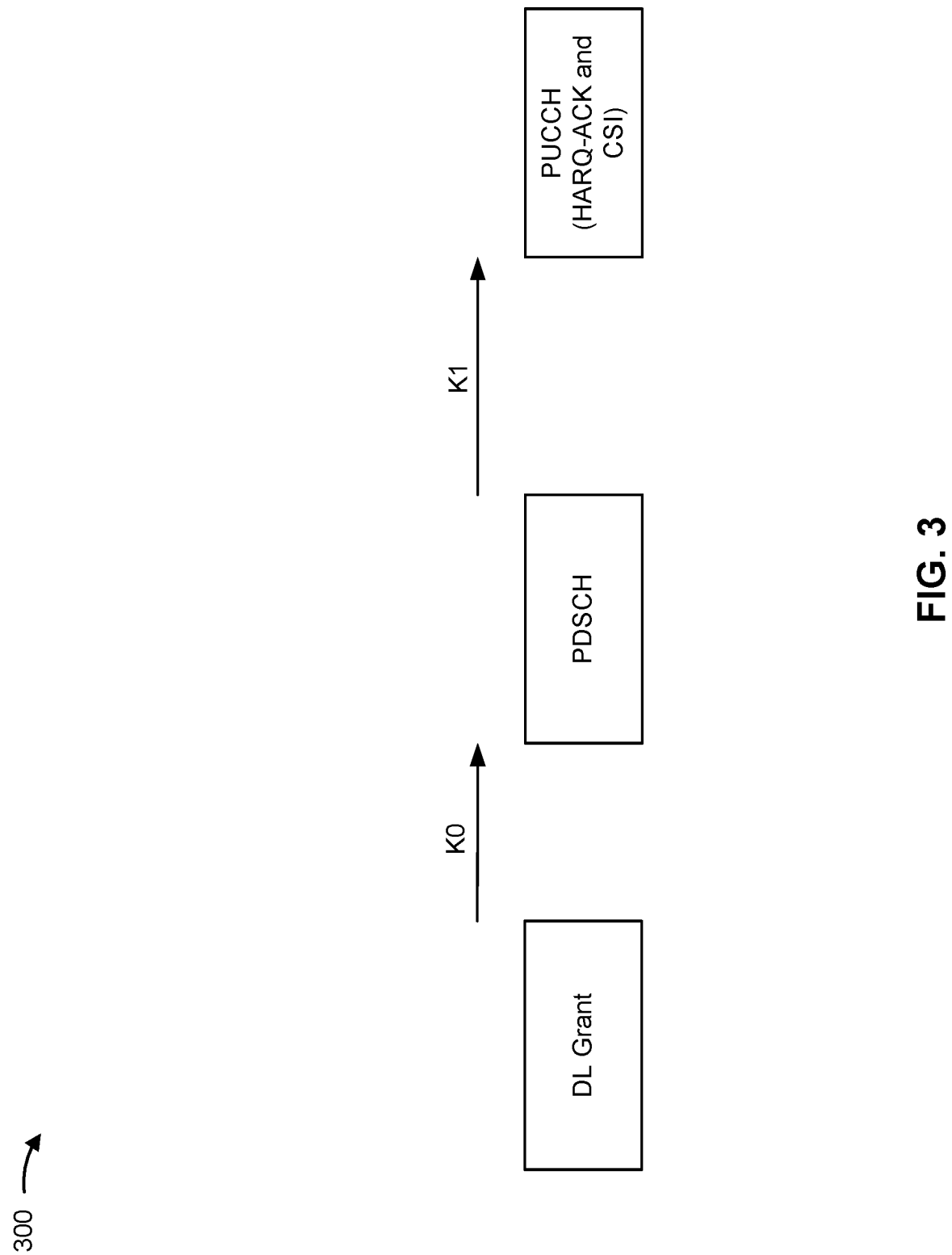
FIGS. 3-6 are diagrams illustrating examples of uplink control information (UCI) reporting, in accordance with the present disclosure.

FIG. 3 is a diagram illustrating an example 300 of UCI reporting, in accordance with the present disclosure.

As shown in FIG. 3, a base station may transmit a downlink grant to a mobile station to schedule a physical downlink shared channel (PDSCH), which may be used to transmit downlink data from the base station to the mobile station. The transmission of the downlink grant from the base station to the mobile station and the transmission of the downlink data from the base station to the mobile station via the PDSCH may be separated by a defined period of time, which may be represented by K0 (in symbols). After the downlink data is transmitted via the PDSCH, the mobile station may transmit uplink control channel data via a physical uplink control channel (PUCCH). The uplink control channel data may include a HARQ-ACK and CSI. The HARQ-ACK and the CSI may be UCI that is transmitted from the mobile station. The uplink control channel data may be based at least in part on the downlink data previously transmitted via the PDSCH. The transmission of the downlink data from the base station to the mobile station via the PDSCH, and the transmission of the uplink control channel data from the mobile station to the base station via the PUCCH, may be separated by a defined period of time, which may be represented by K1 (in symbols).

As indicated above, FIG. 3 is provided as an example. Other examples may differ from what is described with regard to FIG. 3.

Figure 4:
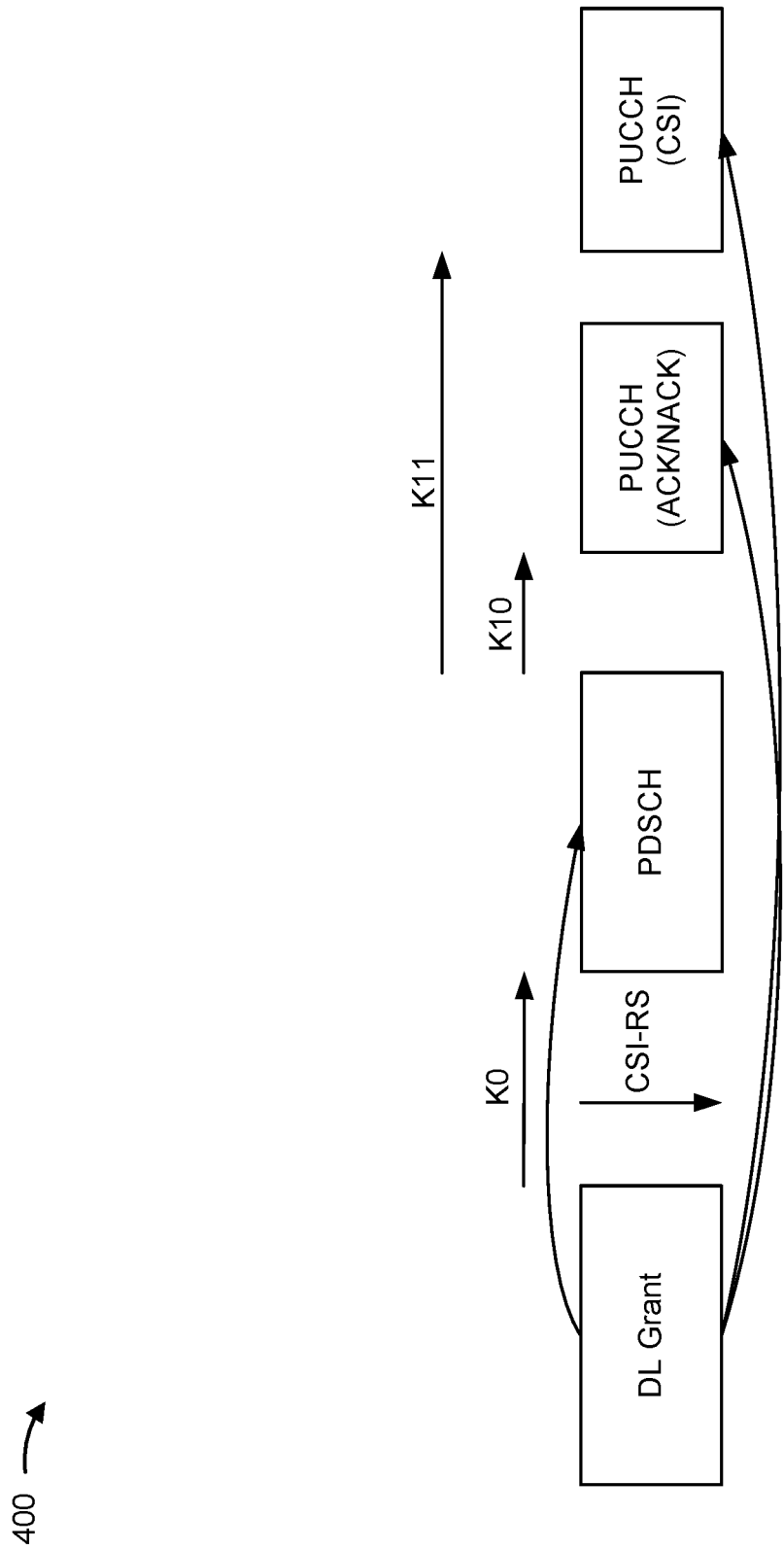

FIG. 4 is a diagram illustrating an example 400 of UCI reporting, in accordance with the present disclosure.

As shown in FIG. 4, a base station may transmit a downlink grant to a mobile station to schedule a PDSCH, which may be used to transmit downlink data from the base station to the mobile station. The transmission of the downlink grant from the base station to the mobile station and the transmission of the downlink data from the base station to the mobile station via the PDSCH may be separated by a defined period of time, which may be represented by K0 (in symbols). During the defined period of time, the base station may transmit a channel state information reference signal (CSI-RS) to the mobile station. The CSI-RS may trigger a CSI report to be later transmitted by the mobile station.

After the downlink data is transmitted via the PDSCH, the mobile station may transmit first uplink control channel data via a first PUCCH. The first uplink control channel data may include an ACK/NACK. The mobile station may also transmit second uplink control channel data via a second PUCCH. The second uplink control channel data may include CSI. The ACK/NACK and the CSI may be UCI that is transmitted from the mobile station. In some cases, the ACK/NACK and the CSI may be included in a same PUCCH resource (e.g., a time-frequency resource). The first uplink control channel data and/or the second uplink control channel data may be based at least in part on the downlink data previously transmitted via the PDSCH and/or the CSI-RS. The first uplink control channel data and/or the second uplink control channel data may be transmitted separately for reduced latency and increased reliability.

The transmission of the downlink data from the base station to the mobile station via the PDSCH, and the transmission of the first uplink control channel data from the mobile station to the base station via the first PUCCH, may be separated by a defined period of time, which may be represented by K10 (in symbols). The transmission of the downlink data from the base station to the mobile station via the PDSCH and the transmission of the second uplink control channel data from the mobile station to the base station via the second PUCCH may be separated by a defined period of time, which may be represented by K11 (in symbols). In some cases, K11 may be equal to or greater than K10.

As indicated above, FIG. 4 is provided as an example. Other examples may differ from what is described with regard to FIG. 4.

Figure 5:
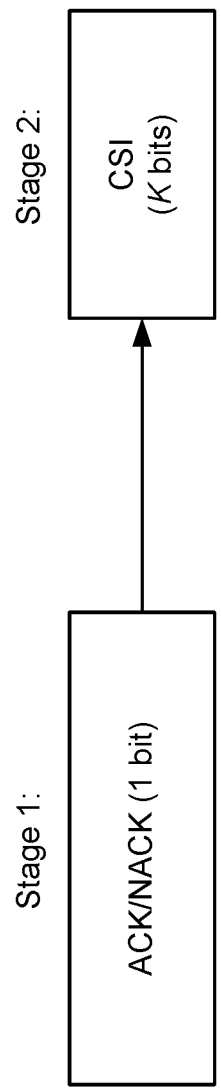

FIG. 5 is a diagram illustrating an example 500 of UCI reporting, in accordance with the present disclosure.

As shown in FIG. 5, a mobile station may perform two-stage UCI reporting based at least in part on downlink data previously transmitted from a base station to the mobile station via a PDSCH and/or a CSI-RS previously transmitted from the base station to the mobile station. A first stage of the UCI reporting may involve the mobile station transmitting an ACK/NACK to the base station. A second stage of the UCI reporting may involve the mobile station transmitting CSI to the base station. The ACK/NACK may be one bit, and the CSI may be K bits, where K is a positive integer. In two-stage UCI reporting, the ACK/NACK may be transmitted on separate uplink resources as compared to the CSI. The ACK/NACK and the CSI may be transmitted on separate slots or uplink grants, or the ACK/NACK and the CSI may be transmitted using a separate resource block allocation within a same slot.

As indicated above, FIG. 5 is provided as an example. Other examples may differ from what is described with regard to FIG. 5.

Figure 6:
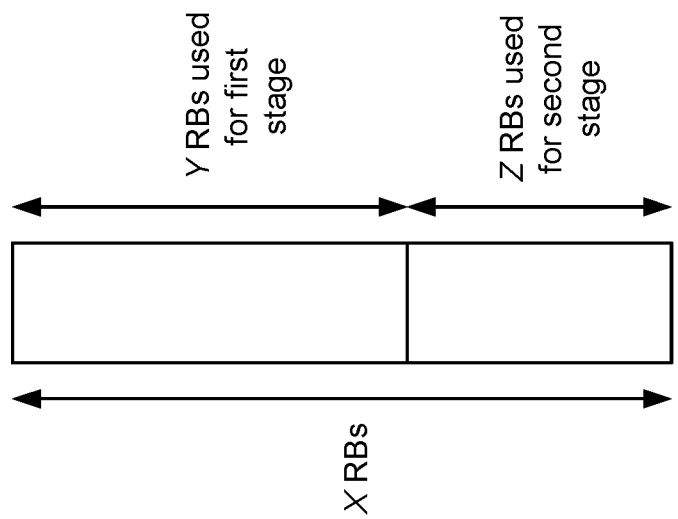

FIG. 6 is a diagram illustrating an example 600 of UCI reporting, in accordance with the present disclosure.

As shown in FIG. 6, a mobile station may use a PUCCH resource to transmit first UCI and second UCI using frequency division multiplexing. The first UCI (e.g., HARQ ACK/NACK) may be associated with a first stage of UCI reporting, and the second UCI (e.g., CSI) may be associated with a second stage of UCI reporting. The first UCI may be represented using a first number of bits and the second UCI may be represented using a second number of bits.

In the example shown in FIG. 6, the PUCCH resource may include X resource blocks at a same time but in different frequencies, where X is a positive integer. In this example, within the X resource blocks of the PUCCH resource, Y resource blocks may be assigned to the first stage of UCI reporting based at least in part on a configured PUCCH coding rate and/or the first number of bits corresponding to the first UCI, where Y is a positive integer. The second stage of UCI reporting may use a same PUCCH coding rate as compared to the first stage of UCI reporting. Z resource blocks may be assigned to the second stage of UCI reporting based at least in part on the same PUCCH coding rate and/or the second number of bits corresponding to the second UCI, where Z is a positive integer. In this example, Y plus Z may be equal to X.

As indicated above, FIG. 6 is provided as an example. Other examples may differ from what is described with regard to FIG. 6.

In previous designs, two-stage UCI reporting performed by a mobile station involved transmitting first UCI and second UCI using a frequency division multiplexing approach. However, the frequency division multiplexing approach often resulted in a first number of resource blocks associated with the first UCI being different from a second number of resource blocks associated with the second UCI. As a result, a transmit power between transmissions of the first UCI and the second UCI could not be aligned, which affected a power control at the mobile station.

In various aspects of techniques and apparatuses described herein, two-stage UCI reporting performed by a mobile station may involve transmitting first UCI and second UCI in a same resource (e.g., a single time-frequency resource) in a slot. The first UCI and the second UCI may occupy the same resource in the slot, but may be separated by different power levels or by different codes or sequences. By occupying the same resource in the slot, the first UCI and the second UCI may achieve an increased coding gain.

In various aspects of techniques and apparatuses described herein, two-stage UCI reporting performed by a mobile station may involve transmitting first UCI and second UCI using a time division multiplexing approach. The first UCI and the second UCI may be transmitted from the mobile station over different time resources within a single slot. With the time division multiplexing approach, an equal number of resource blocks may be configured in the single slot for transmitting the first UCI and transmitting the second UCI. The equal number of resource blocks may be configured via signaling from a base station, or may be determined at the mobile station. The equal number of resource blocks in the single slot may result in a transmit power being aligned between a transmission of the first UCI and a transmission of the second UCI, thereby not affecting a power control at the mobile station. The alignment of the transmit power may also maintain a phase coherence between a first stage associated with the transmission of the first UCI and a second stage associated with the transmission of the second UCI.

Figure 7:
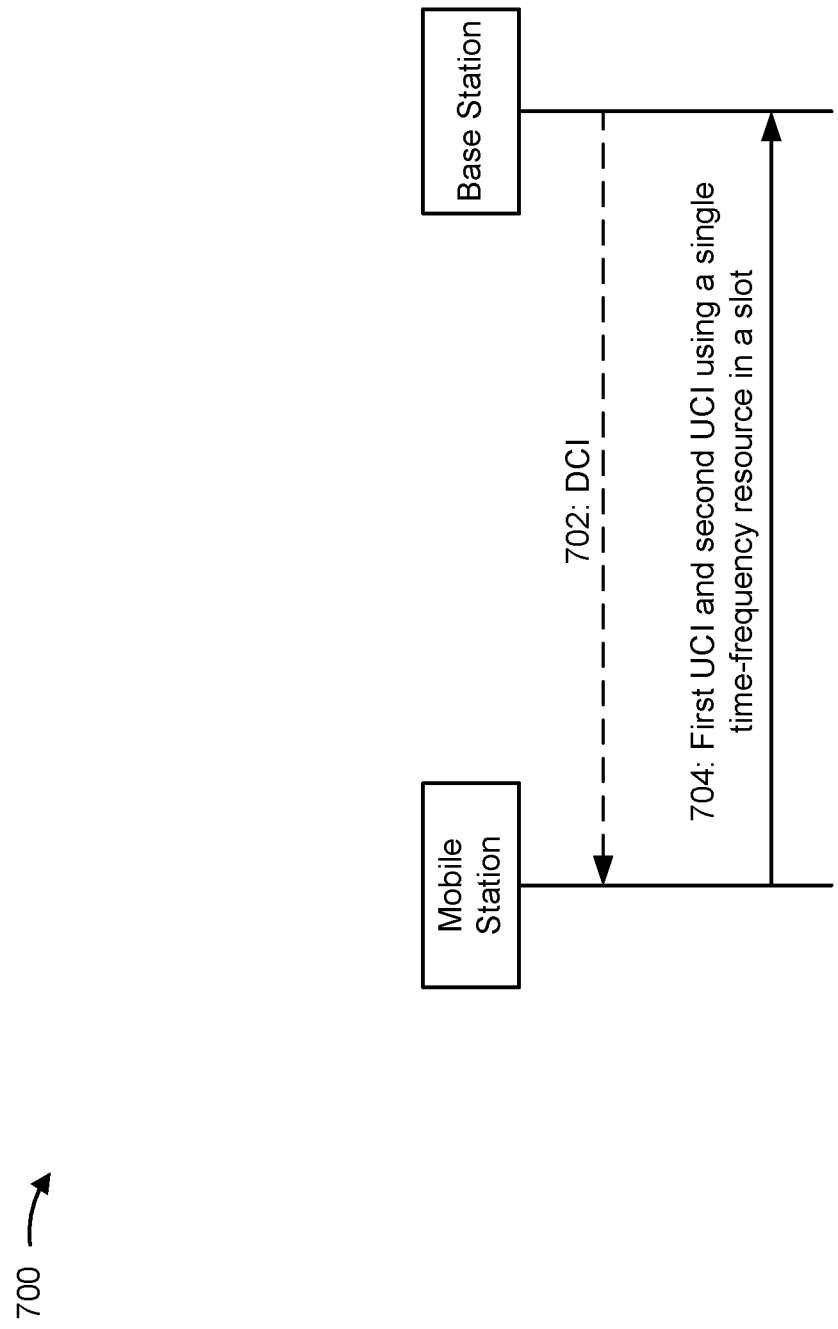
FIGS. 7-10 are diagrams illustrating examples associated with UCI reporting, in accordance with the present disclosure.

FIG. 7 is a diagram illustrating an example 700 of UCI reporting, in accordance with the present disclosure. As shown in FIG. 7, example 700 includes communication between a mobile station (e.g., UE 120) and a base station (e.g., base station 110). In some aspects, the mobile station and the base station may be included in a wireless network such as wireless network 100. The mobile station and the base station may communicate on a wireless sidelink.

As shown by reference number 702, the mobile station may receive downlink control information (DCI) from the base station. The DCI may include power boosting information. The power boosting information (e.g., a beta value that indicates a level of power boosting) may enable the mobile station to subsequently transmit UCI to the base station.

As shown by reference number 704, the mobile station may transmit, to the base station, first UCI associated with a first UCI stage using a time-frequency resource of a slot. The mobile station may transmit the first UCI using a single time-frequency resource in the slot to increase a coding gain of the first UCI. The first UCI may include an ACK or a NACK.

In some aspects, the mobile station may transmit the first UCI using a first orthogonal cover code (OCC). In some aspects, the mobile station may encode the first UCI using a first set of sequences. The mobile station may use the first set of sequences when sequence-based encoding is used for data encoding/transmission at the mobile station. The first set of sequences may be associated with a pseudo-random sequence, such as a Gold sequence or a Zadoff-Chu sequence.

As further shown by reference number 704, the mobile station may transmit, to the base station, second UCI associated with a second UCI stage using the time-frequency resource of the slot. The mobile station may transmit the second UCI using the single time-frequency resource in the slot to increase a coding gain of the second UCI. The second UCI may include CSI. The first UCI and the second UCI may be transmitted to the base station in a single transmission.

In some aspects, the mobile station may transmit the second UCI using a second OCC. In some aspects, the mobile station may transmit the second UCI using a second set of sequences. The mobile station may use the second set of sequences when sequence-based encoding is used for data encoding/transmission at the mobile station. The second set of sequences may be associated with a pseudo-random sequence, such as a Gold sequence or a Zadoff-Chu sequence.

In some aspects, the first set of sequences used to encode the first UCI may be different than the second set of sequences used to encode the second UCI. In one example, the first set of sequences used to encode the first UCI may be orthogonal to the second set of sequences used to encode the second UCI.

In some aspects, when sequence based encoding is used, the first UCI may be encoded with the first set of sequences that are orthogonal with the second set of sequences used to encode the second UCI. For example, for N orthogonal sequences, N1 sequences may be used to encode the first UCI while N−N1 sequences may be used to encode the second UCI. Further, two possible sequences with different encoding characteristics may be used. For example, the first UCI may be encoded with DFT, Reed-Solomon codes, Gold sequence, or Walsh codes encoding, while the second UCI may be encoded with DFT, Reed-Solomon codes, Gold sequence, or Walsh codes encoding.

In some aspects, the mobile station may apply a first transmit power to the first UCI and a second transmit power to the second UCI based at least in part on the power boosting information included in the DCI. In other words, the first transmit power may be associated with the first UCI, and the second transmit power may be associated with the second UCI. In some aspects, the first transmit power may be greater than the second transmit power, when the first UCI is associated with an increased priority level as compared to the second UCI.

For example, the first UCI (e.g., ACK/NACK information) may be associated with an increased priority level as compared to the second UCI (e.g., CSI), so the first transmit power applied when transmitting the first UCI may be greater than the second transmit power applied when transmitting the second UCI.

As indicated above, FIG. 7 is provided as an example. Other examples may differ from what is described with regard to FIG. 7.

Figure 8:
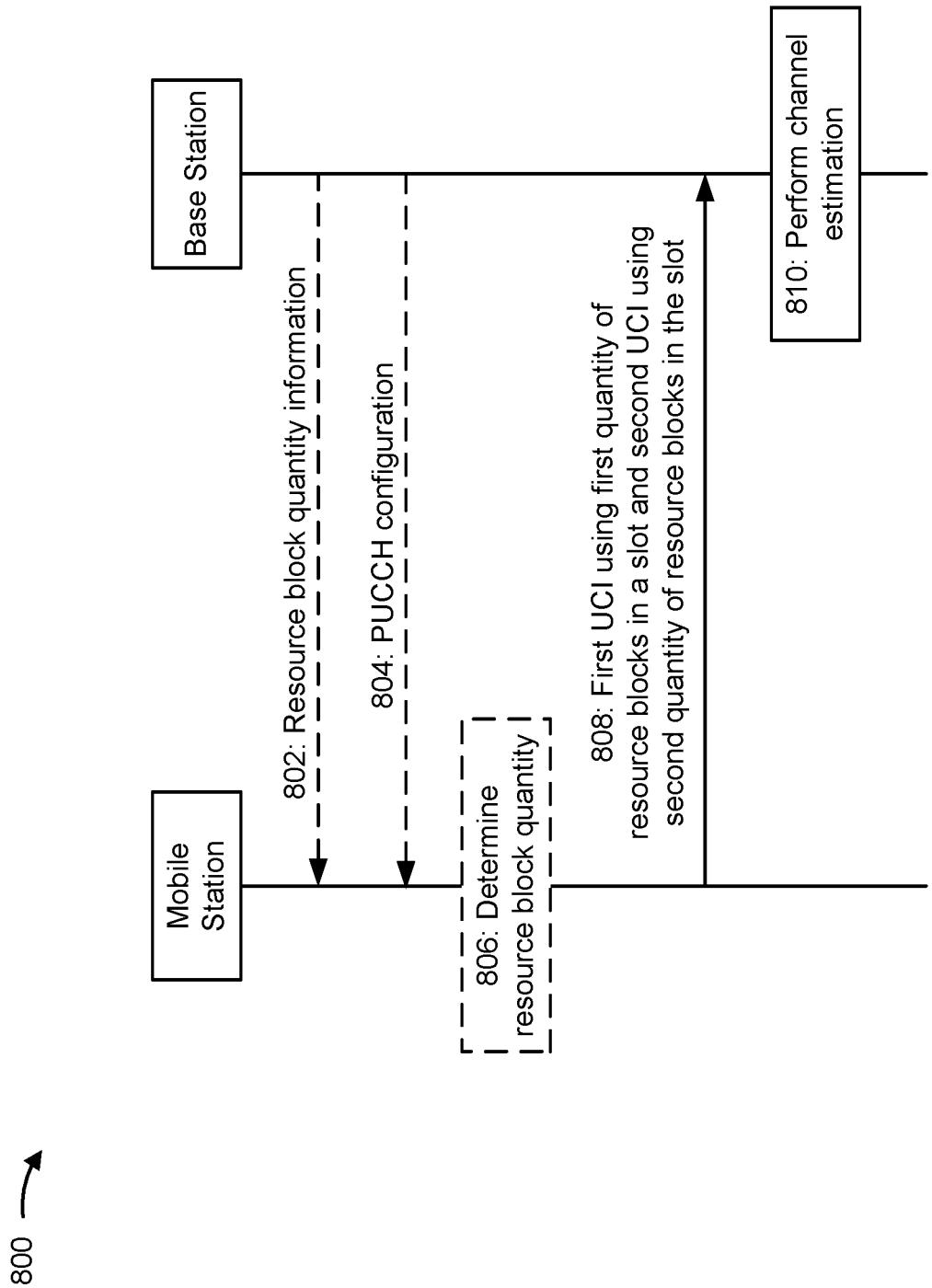

FIG. 8 is a diagram illustrating an example 800 of UCI reporting, in accordance with the present disclosure. As shown in FIG. 8, example 800 includes communication between a mobile station (e.g., UE 120) and a base station (e.g., base station 110). In some aspects, the mobile station and the base station may be included in a wireless network such as wireless network 100. The mobile station and the base station may communicate on a wireless sidelink.

As shown by reference number 802, the mobile station may receive resource block quantity information from the base station. The resource block quantity information may indicate a first quantity of resource blocks in a slot available for transmitting first UCI from the mobile station to the base station. The resource block quantity information may further indicate a second quantity of resource blocks in the slot available for transmitting second UCI from the mobile station to the base station. The first and second quantities of resource blocks may be fixed values. In some aspects, the mobile station may receive DCI indicating the resource block quantity information. In some aspects, the mobile station may receive a radio resource control (RRC) message indicating the resource block quantity information. In some aspects, the mobile station may receive a medium access control-control element (MAC-CE) indicating the resource block quantity information.

In some aspects, the resource block quantity information may indicate that the first quantity of resource blocks is equal to the second quantity of resource blocks, which may allow a transmit power to be aligned between a transmission of the first UCI and a transmission of the second UCI.

As shown by reference number 804, the mobile station may receive, from the base station, a PUCCH configuration indicating a first PUCCH resource and a second PUCCH resource. The first PUCCH resource may be configured with a defined number of symbols for the first UCI, and the second PUCCH resource may be configured with a defined number of symbols for the second UCI. In some aspects, the defined number of symbols for the first UCI may be not equal to the defined number of symbols for the second UCI.

In some aspects, the first PUCCH resource and the second PUCCH resource may be associated with a PUCCH format. For example, a single PUCCH format may be associated with both the first PUCCH resource and the second PUCCH resource. In some aspects, the first PUCCH resource may be associated with a first PUCCH format and the second PUCCH resource may be associated with a second PUCCH format. In other words, the first PUCCH resource and the second PUCCH resource may be associated with different PUCCH formats.

In some aspects, as shown by reference number 804, the mobile station may receive, from the base station, a PUCCH configuration indicating a single PUCCH resource associated with a PUCCH format. The PUCCH resource may be configured with a defined number of symbols, where a first portion of the defined number of symbols are to be associated with the first UCI and a second portion of the defined number of symbols are to be associated with the second UCI. In some aspects, the mobile station may receive, from the base station, the PUCCH configuration indicating the first portion of the defined number of symbols and/or the second portion of the defined number of symbols via DCI, an RRC message, or a MAC-CE.

In one example, the single PUCCH resource may correspond to Y OFDM symbols, where Y is a positive integer. The mobile station may receive, from the base station, an indication (via DCI, an RRC message, or a MAC-CE) that X OFDM symbols of the Y OFDM symbols are to be used for the first UCI, and remaining OFDM symbols are to be used for the second UCI, where X is a positive integer.

In some aspects, the mobile station may receive an RRC message, from the base station, indicating a starting resource block and a maximum number of available resource blocks (or a cap value of a used number of resource blocks) associated with the PUCCH format. In other words, the RRC message may indicate the starting resource block and the maximum number of available resource blocks for each PUCCH format associated with the PUCCH resources.

As shown by reference number 806, the mobile station may determine the first quantity of resource blocks and the second quantity of resource blocks based at least in part on a payload size of the first UCI or the second UCI, an RRC configured PUCCH code rate, a number of symbols available for an applicable PUCCH format, or a number of symbols available in the first PUCCH resource and/or the second PUCCH resource indicated in the PUCCH configuration.

In some aspects, the mobile station may determine the first quantity of resource blocks and the second quantity of resource blocks based at least in part on the second UCI. The second UCI may be associated with an increased number of bits as compared to the first UCI, so the first quantity of resource blocks and the second quantity of resource blocks may be based at least in part on the second UCI as opposed to the first UCI.

As shown by reference number 808, the mobile station may transmit, to the base station, the first UCI using the first quantity of resource blocks in the slot. The first UCI may be associated with a first UCI stage (or a first stage of UCI reporting). In some aspects, the mobile station may transmit the first UCI using the first quantity of resource blocks, as determined at the mobile station based at least in part on the resource block quantity information received from the base station (e.g., in DCI, an RRC message, or a MAC-CE). In some aspects, the mobile station may transmit the first UCI using the first quantity of resource blocks, as determined at the mobile station based at least in part on the PUCCH configuration received from the base station. In some aspects, the mobile station may transmit the first UCI using the first quantity of resource blocks, as determined at the mobile station based at least in part on the payload size, the RRC configured PUCCH code rate, the number of symbols available for the applicable PUCCH format, or the number of symbols available in the first PUCCH resource and/or the second PUCCH resource indicated in the PUCCH configuration.

As further shown by reference number 808, the mobile station may transmit, to the base station, the second UCI using the second quantity of resource blocks in the slot. The second UCI may be associated with a second UCI stage (or a second stage of UCI reporting). The second quantity of resource blocks may be separated in a time domain from the first quantity of resource blocks in the slot using time division multiplexing. In some aspects, the first quantity of resource blocks may be equal to the second quantity of resource blocks. The first UCI and the second UCI may be transmitted to the base station in a single transmission.

In some aspects, the mobile station may transmit the second UCI using the second quantity of resource blocks, as determined at the mobile station based at least in part on the resource block quantity information received from the base station (e.g., in DCI, an RRC message, or a MAC-CE). In some aspects, the mobile station may transmit the second UCI using the second quantity of resource blocks, as determined at the mobile station based at least in part on the PUCCH configuration received from the base station. In some aspects, the mobile station may transmit the second UCI using the second quantity of resource blocks, as determined at the mobile station based at least in part on the payload size, the RRC configured PUCCH code rate, the number of symbols available for the applicable PUCCH format, or the number of symbols available in the first PUCCH resource and/or the second PUCCH resource indicated in the PUCCH configuration.

As shown by reference number 810, the base station may perform a channel estimation for the second UCI stage based at least in part on the first UCI associated with the first UCI stage. For example, the base station may decode the first UCI associated with the first UCI stage. The base station may use the first UCI as an additional DMRS to improve the channel estimation for the second UCI stage. In one example, the channel estimation may be improved for the second UCI stage since the first UCI and the second UCI are transmitted in the same slot.

As indicated above, FIG. 8 is provided as an example. Other examples may differ from what is described with regard to FIG. 8.

Figure 9:
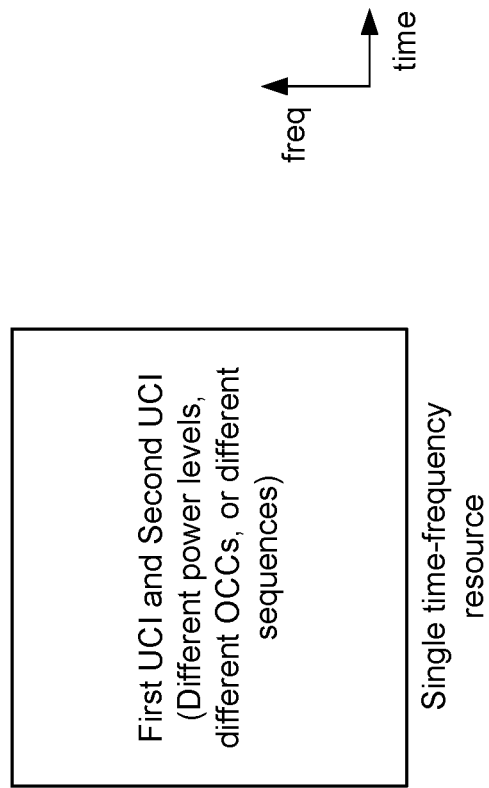

FIG. 9 is a diagram illustrating an example 900 of UCI reporting, in accordance with the present disclosure.

As shown in FIG. 9, the first UCI and the second UCI may occupy a single time-frequency resource of a slot. The first UCI may be associated with a first UCI stage and the second UCI may be associated with a second UCI stage. In some aspects, the first UCI and the second UCI may be separated within the single time-frequency resource of the slot based at least in part on different power levels. For example, the first UCI may be associated with a first power level and the second UCI may be associated with a second power level. In some aspects, the first UCI and the second UCI may be separated within the single time-frequency resource of the slot based at least in part on different OCCs. For example, the first UCI may be associated with a first OCC and the second UCI may be associated with a second OCC. In some aspects, the first UCI and the second UCI may be separated within the single time-frequency resource of the slot based at least in part on different sequences. For example, the first UCI may be associated with a first set of sequences and the second UCI may be associated with a second set of sequences.

In some aspects, when the first UCI and the second UCI are power aligned, the first UCI associated with the first UCI stage may be used as a DMRS for the second UCI stage, which may improve a decodability of the second UCI stage.

As indicated above, FIG. 9 is provided as an example. Other examples may differ from what is described with regard to FIG. 9.

Figure 10:
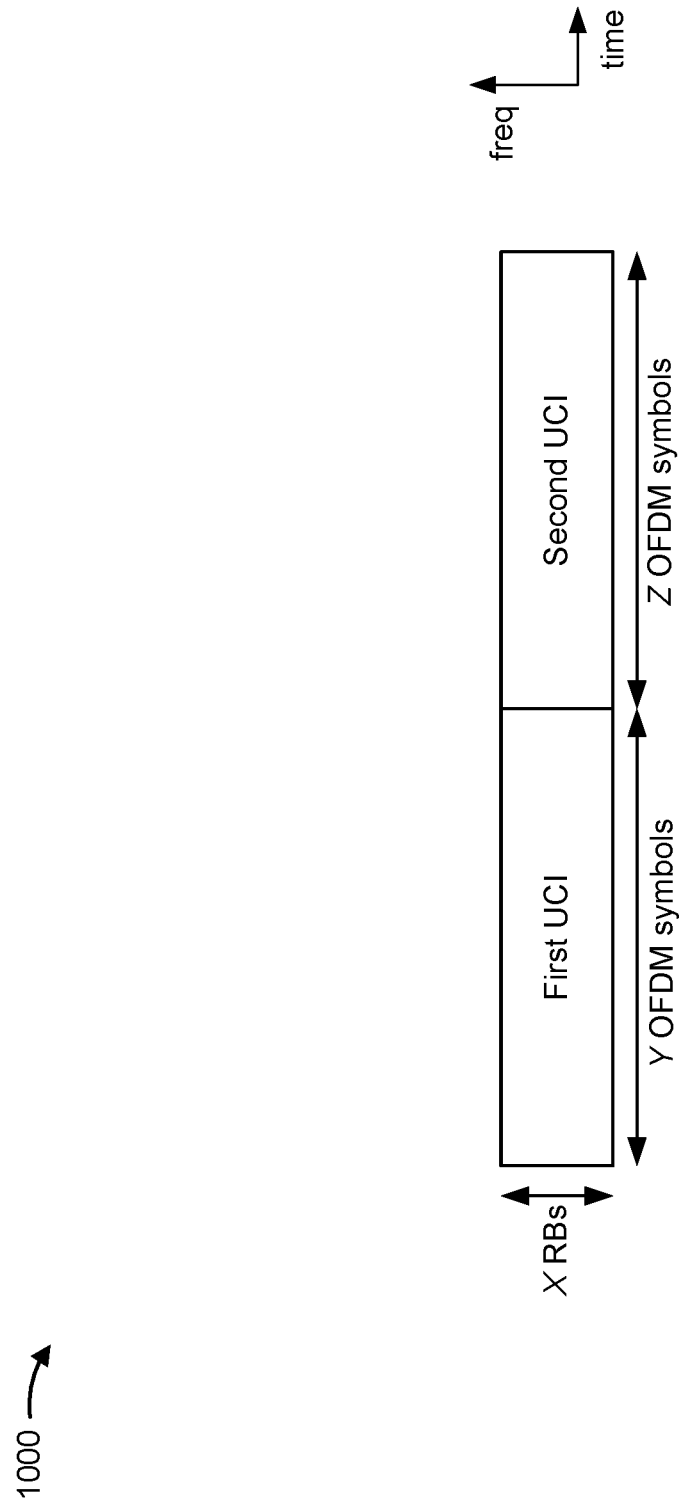

FIG. 10 is a diagram illustrating an example 1000 of UCI reporting, in accordance with the present disclosure.

As shown in FIG. 10, a time division multiplexing scheme may be employed to transmit first UCI associated with a first UCI stage and second UCI associated with a second UCI stage. The first UCI and the second UCI may be transmitted using a same number of resource blocks. For example, the first UCI may be transmitted using x resource blocks, and the second UCI may also be transmitted using x resource blocks, where x is a positive integer. By using the same number of resource blocks to transmit the first UCI and the second UCI, a transmit power may be aligned between the first UCI stage and the second UCI stage. Further, the first UCI may be transmitted using y OFDM symbols, and the second UCI may be transmitted using z OFDM symbols. In some cases, y and z may be the same value, or alternatively, y and z may be different values.

In some aspects, when the time division multiplexing scheme is used with the same number of resource blocks, the first UCI associated with the first UCI stage may be used as a DMRS for the second UCI stage, which may improve a decodability of the second UCI stage.

As indicated above, FIG. 10 is provided as an example. Other examples may differ from what is described with regard to FIG. 10.

Figure 11:
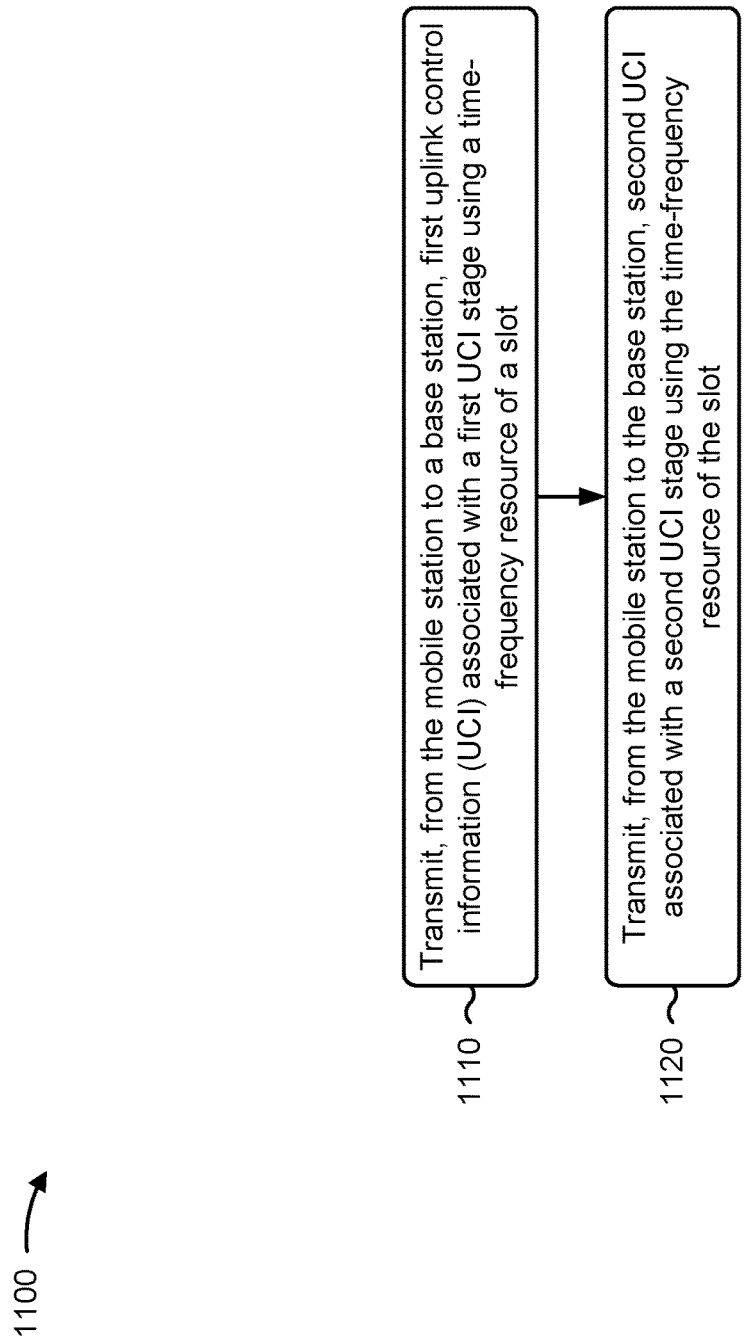
FIGS. 11-14 are diagrams illustrating example processes associated with UCI reporting, in accordance with the present disclosure.

FIG. 11 is a diagram illustrating an example process 1100 performed, for example, by a mobile station, in accordance with the present disclosure. Example process 1100 is an example where the mobile station (e.g., UE 120) performs operations associated with UCI reporting.

As shown in FIG. 11, in some aspects, process 1100 may include transmitting, from the mobile station to a base station, first UCI associated with a first UCI stage using a time-frequency resource of a slot (block 1110). For example, the mobile station (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, from the mobile station to a base station, first UCI associated with a first UCI stage using a time-frequency resource of a slot, as described above.

As further shown in FIG. 11, in some aspects, process 1100 may include transmitting, from the mobile station to the base station, second UCI associated with a second UCI stage using the time-frequency resource of the slot (block 1120). For example, the mobile station (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, from the mobile station to the base station, second UCI associated with a second UCI stage using the time-frequency resource of the slot, as described above.

Process 1100 may include additional aspects, such as any single aspect or any combination of aspects described below and/or in connection with one or more other processes described elsewhere herein.

In a first aspect, the first UCI is associated with a first transmit power and the second UCI is associated with a second transmit power.

In a second aspect, the first transmit power is greater than the second transmit power.

In a third aspect, the first UCI is associated with an increased priority level as compared to the second UCI.

In a fourth aspect, process 1100 includes receiving, from the base station, downlink control information that includes power boosting information, and applying the first transmit power to the first UCI and the second transmit power to the second UCI based at least in part on the power boosting information.

In a fifth aspect, the first UCI includes an acknowledgement or a negative acknowledgement, and the second UCI includes channel state information.

In a sixth aspect, transmitting the first UCI comprises transmitting the first UCI using a first OCC, and transmitting the second UCI comprises transmitting the second UCI using a second OCC.

In a seventh aspect, transmitting the first UCI comprises encoding the first UCI using a first set of sequences, and transmitting the second UCI comprises encoding the second UCI using a second set of sequences.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
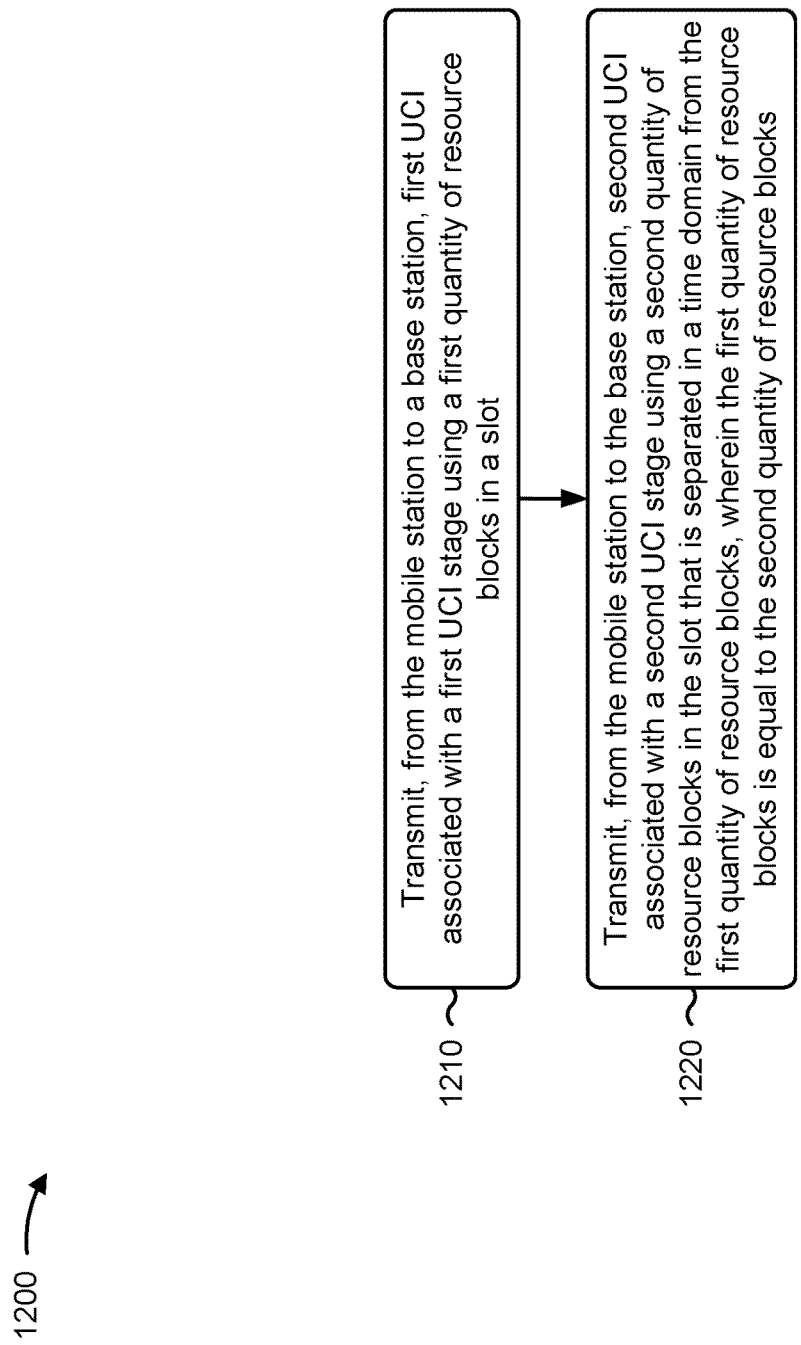

FIG. 12 is a diagram illustrating an example process 1200 performed, for example, by a mobile station, in accordance with the present disclosure. Example process 1200 is an example where the mobile station (e.g., UE 120) performs operations associated with UCI reporting.

As shown in FIG. 12, in some aspects, process 1200 may include transmitting, from the mobile station to a base station, first UCI associated with a first UCI stage using a first quantity of resource blocks in a slot (block 1210). For example, the mobile station (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, from the mobile station to a base station, first UCI associated with a first UCI stage using a first quantity of resource blocks in a slot, as described above.

As further shown in FIG. 12, in some aspects, process 1200 may include transmitting, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks (block 1220). For example, the mobile station (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks, as described above.

Process 1200 may include additional aspects, such as any single aspect or any combination of aspects described below and/or in connection with one or more other processes described elsewhere herein.

In a first aspect, process 1200 includes receiving, from the base station, downlink control information indicating the first quantity of resource blocks and the second quantity of resource blocks.

In a second aspect, process 1200 includes receiving, from the base station, a radio resource control message indicating the first quantity of resource blocks and the second quantity of resource blocks.

In a third aspect, process 1200 includes receiving, from the base station, a medium access control-control element indicating the first quantity of resource blocks and the second quantity of resource blocks.

In a fourth aspect, process 1200 includes receiving, from the base station, an uplink control channel configuration indicating a first uplink control channel resource and a second uplink control channel resource, wherein the first uplink control channel resource is configured with a defined number of symbols for the first UCI, and the second uplink control channel resource is configured with a defined number of symbols for the second UCI.

In a fifth aspect, the defined number of symbols for the first UCI is not equal to the defined number of symbols for the second UCI.

In a sixth aspect, the first uplink control channel resource and the second uplink control channel resource are associated with an uplink control channel format.

In a seventh aspect, process 1200 includes receiving, from the base station, a radio resource control configuration indicating a starting resource block and a maximum number of available resource blocks associated with the uplink control channel format.

In an eighth aspect, process 1200 includes determining the first quantity of resource blocks and the second quantity of resource blocks based at least in part on one or more of a payload size, a radio resource control configured uplink control channel code rate, a number of symbols available for the uplink control channel format, or a number of symbols available in the first uplink control channel resource or the second uplink control channel resource.

In a ninth aspect, the first uplink control channel resource is associated with a first uplink control channel format, and the second uplink control channel resource is associated with a second uplink control channel format.

In a tenth aspect, process 1200 includes receiving, from the base station, an uplink control channel configuration indicating an uplink control channel resource associated with an uplink control channel format, wherein the uplink control channel resource is configured with a defined number of symbols, and wherein a first portion of the defined number of symbols are associated with the first UCI and a second portion of the defined number of symbols are associated with the second UCI.

In an eleventh aspect, receiving the uplink control channel configuration comprises receiving one or more of the first portion of the defined number of symbols or the second portion of the defined number of symbols via downlink control information, a radio resource control message, or a medium access control-control element.

In a twelfth aspect, the first quantity of resource blocks in the slot is separated in the time domain from the second quantity of resource blocks in the slot using time division multiplexing.

In a thirteenth aspect, process 1200 includes determining the first quantity of resource blocks and the second quantity of resource blocks based at least in part on the second UCI, wherein the second UCI is associated with an increased number of bits as compared to the first UCI.

In a fourteenth aspect, the first quantity of resource blocks is equal to the second quantity of resource blocks to align a transmit power between the first UCI stage and the second UCI stage.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
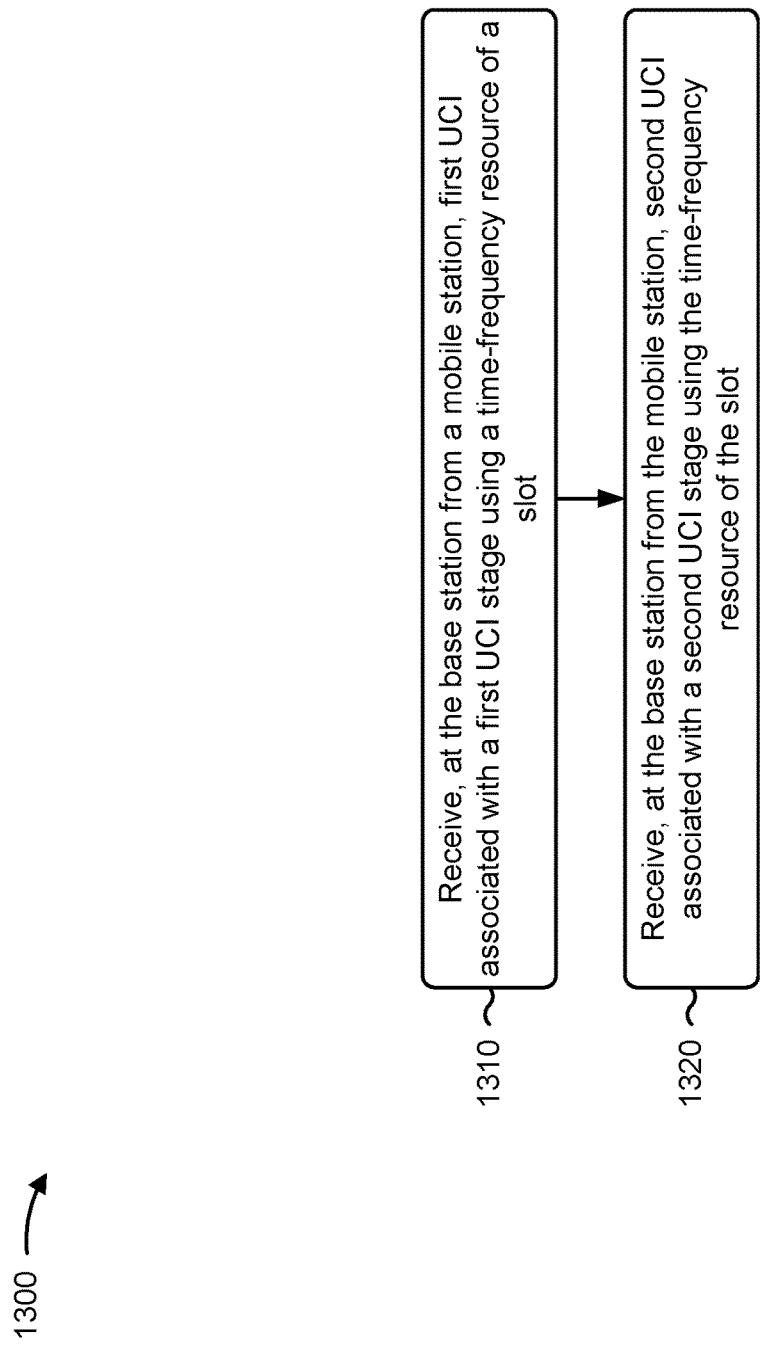

FIG. 13 is a diagram illustrating an example process 1300 performed, for example, by a base station, in accordance with the present disclosure. Example process 1300 is an example where the base station (e.g., base station 110) performs operations associated with UCI reporting.

As shown in FIG. 13, in some aspects, process 1300 may include receiving, at the base station from a mobile station, first UCI associated with a first UCI stage using a time-frequency resource of a slot (block 1310). For example, the base station (e.g., using antenna 234, demodulator 232, MIMO detector 236, receive processor 238, controller/processor 240, and/or memory 242) may receive, at the base station from a mobile station, first UCI associated with a first UCI stage using a time-frequency resource of a slot, as described above.

As further shown in FIG. 13, in some aspects, process 1300 may include receiving, at the base station from the mobile station, second UCI associated with a second UCI stage using the time-frequency resource of the slot (block 1320). For example, the base station (e.g., using antenna 234, demodulator 232, MIMO detector 236, receive processor 238, controller/processor 240, and/or memory 242) may receive, at the base station from the mobile station, second UCI associated with a second UCI stage using the time-frequency resource of the slot, as described above.

Process 1300 may include additional aspects, such as any single aspect or any combination of aspects described below and/or in connection with one or more other processes described elsewhere herein.

In a first aspect, the first UCI is associated with a first transmit power and the second UCI is associated with a second transmit power.

In a second aspect, the first transmit power is greater than the second transmit power.

In a third aspect, process 1300 includes transmitting, to the mobile station, downlink control information that includes power boosting information, wherein the first transmit power is associated with the first UCI and the second transmit power is associated with the second UCI based at least in part on the power boosting information.

In a fourth aspect, the first UCI includes an acknowledgement or a negative acknowledgement, and the second UCI includes channel state information.

In a fifth aspect, receiving the first UCI comprises receiving the first UCI based at least in part on a first OCC, and receiving the second UCI comprises receiving the second UCI based at least in part on a second OCC.

In a sixth aspect, receiving the first UCI comprises decoding the first UCI based at least in part on a first set of sequences, and receiving the second UCI comprises decoding the second UCI based at least in part on a second set of sequences.

In a seventh aspect, the first set of sequences is orthogonal to the second set of sequences.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
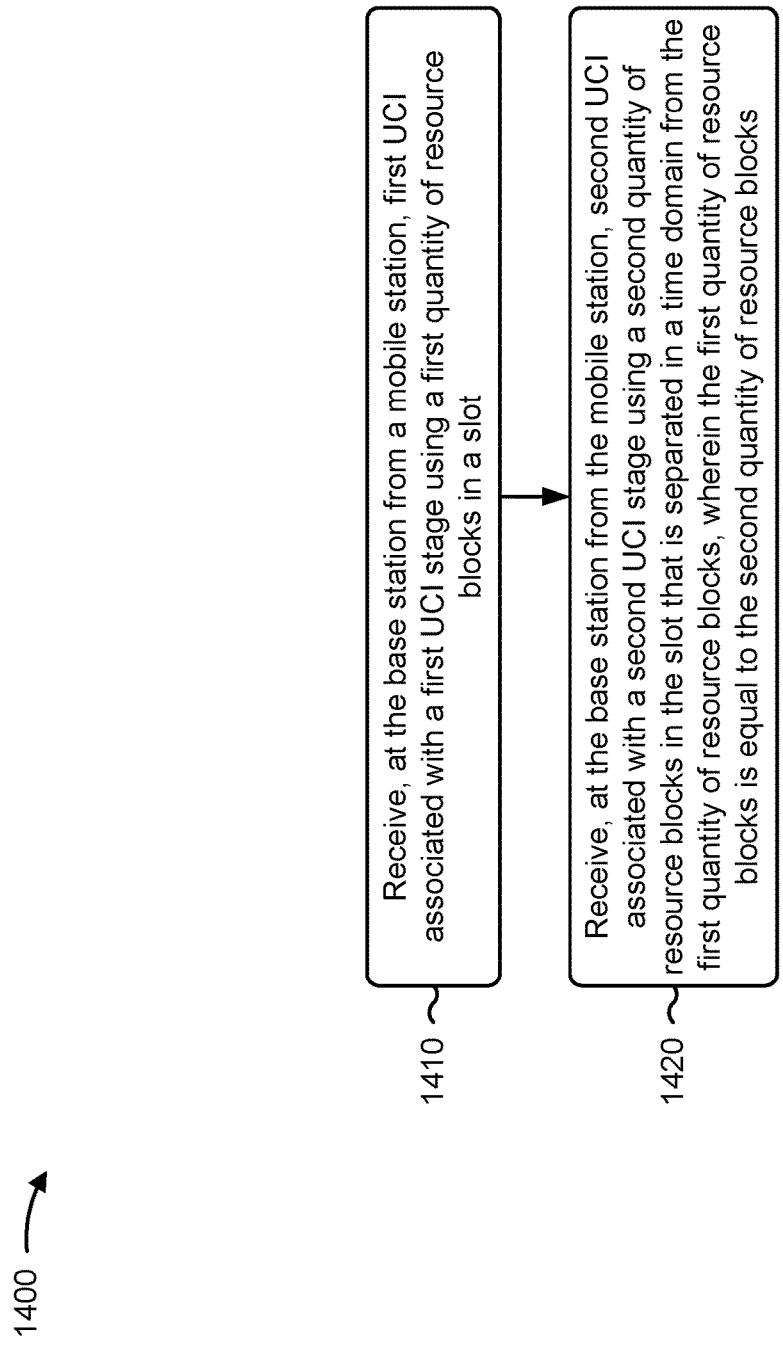

FIG. 14 is a diagram illustrating an example process 1400 performed, for example, by a base station, in accordance with the present disclosure. Example process 1400 is an example where the base station (e.g., base station 110) performs operations associated with UCI reporting.

As shown in FIG. 14, in some aspects, process 1400 may include receiving, at the base station from a mobile station, first UCI associated with a first UCI stage using a first quantity of resource blocks in a slot (block 1410). For example, the base station (e.g., using antenna 234, demodulator 232, MIMO detector 236, receive processor 238, controller/processor 240, and/or memory 242) may receive, at the base station from a mobile station, first UCI associated with a first UCI stage using a first quantity of resource blocks in a slot, as described above.

As further shown in FIG. 14, in some aspects, process 1400 may include receiving, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks (block 1420). For example, the base station (e.g., using antenna 234, demodulator 232, MIMO detector 236, receive processor 238, controller/processor 240, and/or memory 242) may receive, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks, as described above.

Process 1400 may include additional aspects, such as any single aspect or any combination of aspects described below and/or in connection with one or more other processes described elsewhere herein.

In a first aspect, process 1400 includes transmitting, to the mobile station, downlink control information indicating the first quantity of resource blocks and the second quantity of resource blocks.

In a second aspect, process 1400 includes transmitting, to the mobile station, a radio resource control message indicating the first quantity of resource blocks and the second quantity of resource blocks.

In a third aspect, process 1400 includes transmitting, to the mobile station, a medium access control-control element indicating the first quantity of resource blocks and the second quantity of resource blocks.

In a fourth aspect, process 1400 includes transmitting, to the mobile station, an uplink control channel configuration indicating a first uplink control channel resource and a second uplink control channel resource, wherein the first uplink control channel resource is configured with a defined number of symbols for the first UCI, and the second uplink control channel resource is configured with a defined number of symbols for the second UCI.

In a fifth aspect, the defined number of symbols for the first UCI is not equal to the defined number of symbols for the second UCI.

In a sixth aspect, the first uplink control channel resource and the second uplink control channel resource are associated with an uplink control channel format.

In a seventh aspect, process 1400 includes transmitting, to the mobile station, a radio resource control configuration indicating a starting resource block and a maximum number of available resource blocks associated with the uplink control channel format.

In an eighth aspect, the first quantity of resource blocks and the second quantity of resource blocks is based at least in part on one or more of: a payload size, a radio resource control configured uplink control channel code rate, a number of symbols available for the uplink control channel format, or a number of symbols available in the first uplink control channel resource or the second uplink control channel resource.

In a ninth aspect, the first uplink control channel resource is associated with a first uplink control channel format and the second uplink control channel resource is associated with a second uplink control channel format.

In a tenth aspect, process 1400 includes transmitting, to the mobile station, an uplink control channel configuration indicating an uplink control channel resource associated with an uplink control channel format, wherein the uplink control channel resource is configured with a defined number of symbols, and wherein a first portion of the defined number of symbols are associated with the first UCI and a second portion of the defined number of symbols are associated with the second UCI.

In an eleventh aspect, transmitting the uplink control channel configuration comprises transmitting one or more of the first portion of the defined number of symbols or the second portion of the defined number of symbols via downlink control information, a radio resource control message, or a medium access control-control element.

In a twelfth aspect, the first quantity of resource blocks in the slot is separated in the time domain from the second quantity of resource blocks in the slot using time division multiplexing.

In a thirteenth aspect, the first quantity of resource blocks and the second quantity of resource blocks is based at least in part on the second UCI, wherein the second UCI is associated with an increased number of bits as compared to the first UCI.

In a fourteenth aspect, the first quantity of resource blocks is equal to the second quantity of resource blocks to align a transmit power between the first UCI stage and the second UCI stage.

In a fifteenth aspect, process 1400 includes performing a channel estimation for the second UCI stage based at least in part on the first UCI associated with the first UCI stage.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
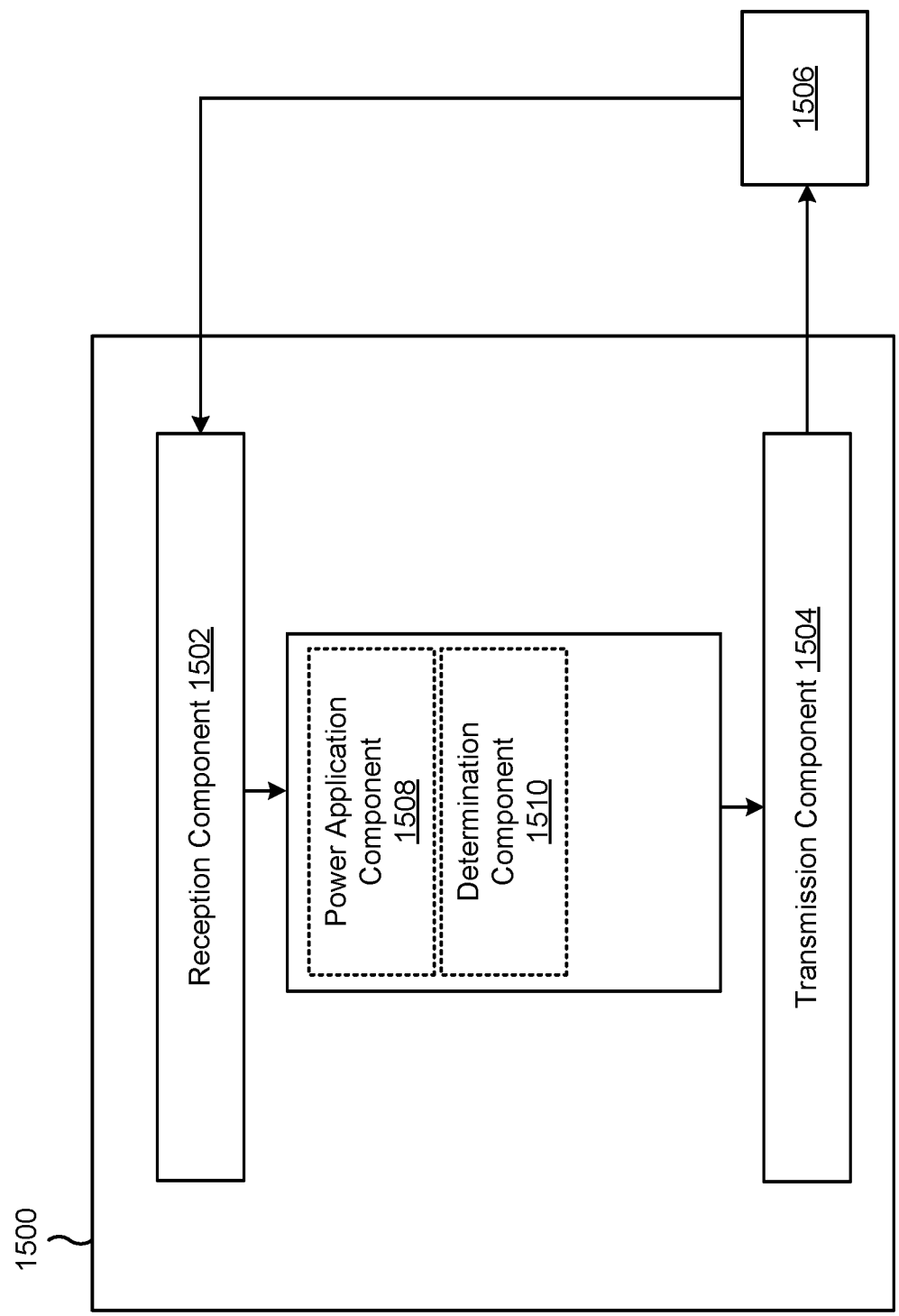
FIGS. 15-16 are block diagrams of example apparatuses for wireless communication, in accordance with the present disclosure.

FIG. 15 is a block diagram of an example apparatus 1500 for wireless communication. The apparatus 1500 may be a mobile station, or a mobile station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a power application component 1508, or a determination component 1510, among other examples.

In some aspects, the apparatus 1500 may be configured to perform one or more operations described herein in connection with FIGS. 7-8. Additionally or alternatively, the apparatus 1500 may be configured to perform one or more processes described herein, such as process 900 of FIG. 9, process 1000 of FIG. 10, or a combination thereof. In some aspects, the apparatus 1500 and/or one or more components shown in FIG. 15 may include one or more components of the mobile station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the mobile station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the mobile station described above in connection with FIG. 2. In some aspects, the transmission component 1504 may be collocated with the reception component 1502 in a transceiver.

The transmission component 1504 may transmit, from the mobile station to a base station, first UCI associated with a first UCI stage using a time-frequency resource of a slot. The transmission component 1504 may transmit, from the mobile station to the base station, second UCI associated with a second UCI stage using the time-frequency resource of the slot.

The reception component 1502 may receive, from the base station, downlink control information that includes power boosting information. The power application component 1508 may apply the first transmit power to the first UCI and the second transmit power to the second UCI based at least in part on the power boosting information. In some aspects, the power application component 1508 may include one or more antennas, a demodulator, a MIMO detector, a receive processor, a modulator, a transmit MIMO processor, a transmit processor, a controller/processor, a memory, or a combination thereof, of the mobile station described above in connection with FIG. 2.

The transmission component 1504 may transmit the first UCI using a first OCC. The transmission component 1504 may transmit the second UCI using a second OCC. The transmission component 1504 may transmit the first UCI using a first set of sequences. The transmission component 1504 may transmit the second UCI using a second set of sequences.

The transmission component 1504 may transmit, from the mobile station to a base station, first UCI associated with a first UCI stage using a first quantity of resource blocks in a slot. The transmission component 1504 may transmit, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks.

The reception component 1502 may receive, from the base station, downlink control information indicating the first quantity of resource blocks and the second quantity of resource blocks. The reception component 1502 may receive, from the base station, a radio resource control message indicating the first quantity of resource blocks and the second quantity of resource blocks. The reception component 1502 may receive, from the base station, a medium access control-control element indicating the first quantity of resource blocks and the second quantity of resource blocks.

The reception component 1502 may receive, from the base station, an uplink control channel configuration indicating a first uplink control channel resource and a second uplink control channel resource, wherein the first uplink control channel resource is configured with a defined number of symbols for the first UCI, and the second uplink control channel resource is configured with a defined number of symbols for the second UCI. The reception component 1502 may receive, from the base station, a radio resource control configuration indicating a starting resource block and a maximum number of available resource blocks associated with the uplink control channel format.

The determination component 1510 may determine the first quantity of resource blocks and the second quantity of resource blocks based at least in part on one or more of a payload size, a radio resource control configured uplink control channel code rate, a number of symbols available for the uplink control channel format, or a number of symbols available in the first uplink control channel resource or the second uplink control channel resource. In some aspects, the determination component 1510 may include one or more antennas, a demodulator, a MIMO detector, a receive processor, a modulator, a transmit MIMO processor, a transmit processor, a controller/processor, a memory, or a combination thereof, of the mobile station described above in connection with FIG. 2.

The reception component 1502 may receive, from the base station, an uplink control channel configuration indicating an uplink control channel resource associated with an uplink control channel format, wherein the uplink control channel resource is configured with a defined number of symbols, and wherein a first portion of the defined number of symbols are associated with the first UCI and a second portion of the defined number of symbols are associated with the second UCI. The reception component 1502 may receive one or more of the first portion of the defined number of symbols or the second portion of the defined number of symbols via downlink control information, a radio resource control message, or a medium access control-control element.

The determination component 1510 may determine the first quantity of resource blocks and the second quantity of resource blocks based at least in part on the second UCI, wherein the second UCI is associated with an increased number of bits as compared to the first UCI.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

Figure 16:
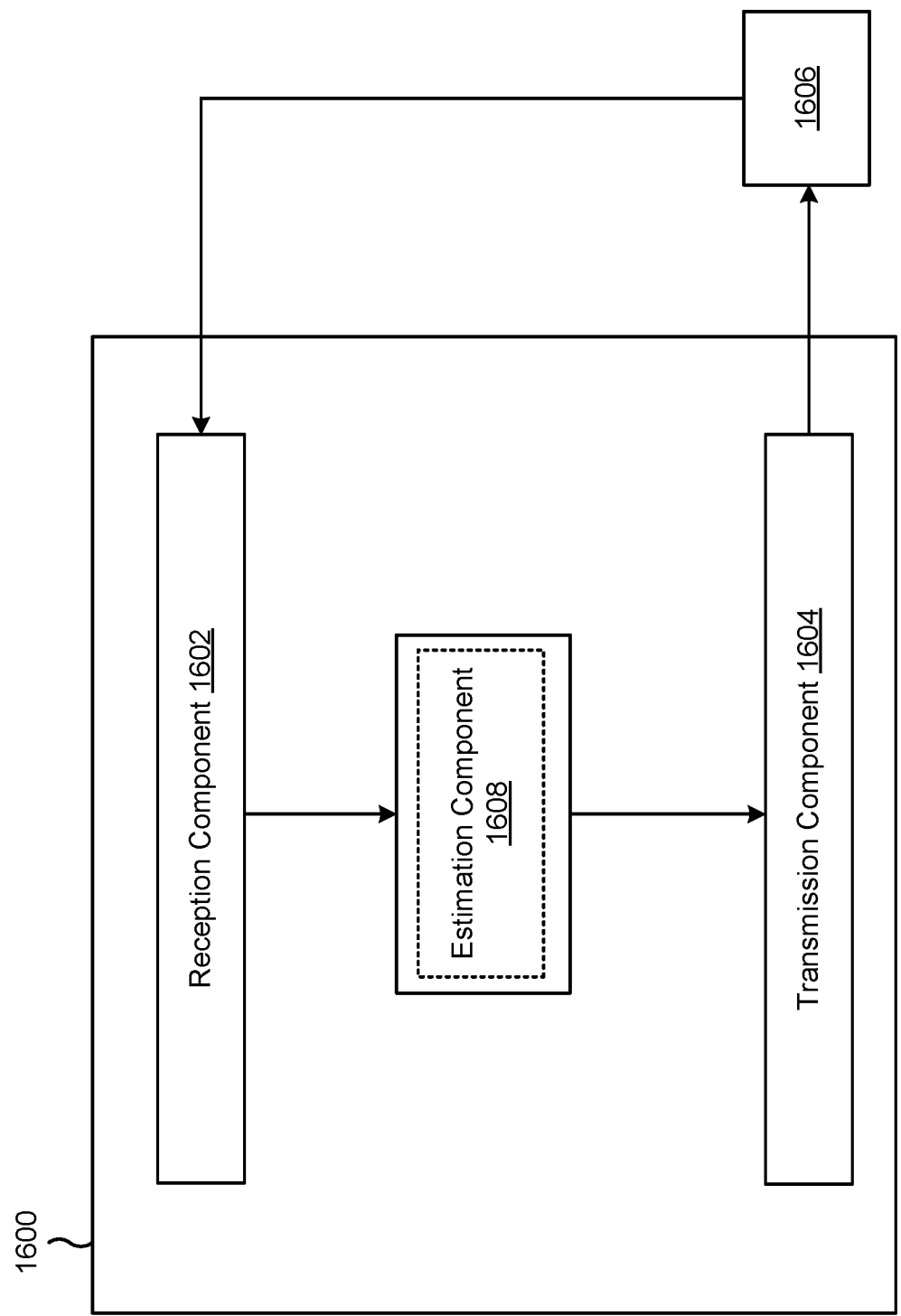

FIG. 16 is a block diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include an estimation component 1608, among other examples.

In some aspects, the apparatus 1600 may be configured to perform one or more operations described herein in connection with FIGS. 7-8. Additionally or alternatively, the apparatus 1600 may be configured to perform one or more processes described herein, such as process 1100 of FIG. 11, process 1200 of FIG. 12, or a combination thereof. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be collocated with the reception component 1602 in a transceiver.

The reception component 1602 may receive, at the base station from a mobile station, first UCI associated with a first UCI stage using a time-frequency resource of a slot. The reception component 1602 may receive, at the base station from the mobile station, second UCI associated with a second UCI stage using the time-frequency resource of the slot.

The transmission component 1604 may transmit, to the mobile station, downlink control information that includes power boosting information, wherein the first transmit power is associated with the first UCI and the second transmit power is associated with the second UCI based at least in part on the power boosting information.

The reception component 1602 may receive the first UCI based at least in part on a first OCC. The reception component 1602 may receive the second UCI based at least in part on a second OCC. The reception component 1602 may decode the first UCI based at least in part on a first set of sequences. The reception component 1602 may decode the second UCI based at least in part on a second set of sequences.

The reception component 1602 may receive, at the base station from a mobile station, first UCI associated with a first UCI stage using a first quantity of resource blocks in a slot. The reception component 1602 may receive, at the base station from the mobile station, second UCI associated with a second UCI stage using a second quantity of resource blocks in the slot that is separated in a time domain from the first quantity of resource blocks, wherein the first quantity of resource blocks is equal to the second quantity of resource blocks.

The transmission component 1604 may transmit, to the mobile station, downlink control information indicating the first quantity of resource blocks and the second quantity of resource blocks. The transmission component 1604 may transmit, to the mobile station, a radio resource control message indicating the first quantity of resource blocks and the second quantity of resource blocks. The transmission component 1604 may transmit, to the mobile station, a medium access control-control element indicating the first quantity of resource blocks and the second quantity of resource blocks.

The transmission component 1604 may transmit, to the mobile station, an uplink control channel configuration indicating a first uplink control channel resource and a second uplink control channel resource, wherein the first uplink control channel resource is configured with a defined number of symbols for the first UCI, and the second uplink control channel resource is configured with a defined number of symbols for the second UCI.

The transmission component 1604 may transmit, to the mobile station, a radio resource control configuration indicating a starting resource block and a maximum number of available resource blocks associated with the uplink control channel format.

The transmission component 1604 may transmit, to the mobile station, an uplink control channel configuration indicating an uplink control channel resource associated with an uplink control channel format, wherein the uplink control channel resource is configured with a defined number of symbols, and wherein a first portion of the defined number of symbols are associated with the first UCI and a second portion of the defined number of symbols are associated with the second UCI. The transmission component 1604 may transmit one or more of the first portion of the defined number of symbols or the second portion of the defined number of symbols via downlink control information, a radio resource control message, or a medium access control-control element.

The estimation component 1608 may perform a channel estimation for the second UCI stage based at least in part on the first UCI associated with the first UCI stage. In some aspects, the estimation component 1608 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a mobile station, comprising: transmitting, from the mobile station to a base station, first uplink control information (UCI) associated with a first UCI stage using a time-frequency resource of a slot; and transmitting, from the mobile station to the base station, second UCI associated with a second UCI stage using the time-frequency resource of the slot.

Aspect 2: The method of Aspect 1, wherein the first UCI is associated with a first transmit power and the second UCI is associated with a second transmit power.

Aspect 3: The method of Aspect 2, wherein the first transmit power is greater than the second transmit power, and wherein the first UCI is associated with an increased priority level as compared to the second UCI.

Aspect 4: The method of Aspect 2, further comprising: receiving, from the base station, downlink control information that includes power boosting information; and applying the first transmit power to the first UCI and the second transmit power to the second UCI based at least in part on the power boosting information.

Aspect 5: The method of any of Aspects 1 through 4, wherein the first UCI includes an acknowledgement or a negative acknowledgement, and the second UCI includes channel state information.

Aspect 6: The method of any of Aspects 1 through 5, wherein: transmitting the first UCI comprises transmitting the first UCI using a first orthogonal cover code (OCC); and transmitting the second UCI comprises transmitting the second UCI using a second OCC.

Aspect 7: The method of any of Aspects 1 through 6, wherein: transmitting the first UCI comprises encoding the first UCI using a first set of sequences; and transmitting the second UCI comprises encoding the second UCI using a second set of sequences.

Aspect 8: A method of wireless communication performed by a mobile station, comprising: transmitting, from the mobile station to a base station, first uplink control information (UCI) associated with a first UCI stage using a first quantity of resource blocks in a slot; and transmitting, from the mobile station to the base station, second UCI associated with a second UCI stage using a second quantity of resource blocks in the slot that is separated in a time domain from the first quantity of resource blocks, wherein the first quantity of resource blocks is equal to the second quantity of resource blocks.

Aspect 9: The method of Aspect 8, further comprising: receiving, from the base station, downlink control information indicating the first quantity of resource blocks and the second quantity of resource blocks; receiving, from the base station, a radio resource control message indicating the first quantity of resource blocks and the second quantity of resource blocks; or receiving, from the base station, a medium access control-control element indicating the first quantity of resource blocks and the second quantity of resource blocks.

Aspect 10: The method of any of Aspects 8 through 9, further comprising: receiving, from the base station, an uplink control channel configuration indicating a first uplink control channel resource and a second uplink control channel resource, wherein the first uplink control channel resource is configured with a defined number of symbols for the first UCI, and the second uplink control channel resource is configured with a defined number of symbols for the second UCI.

Aspect 11: The method of Aspect 10, wherein the defined number of symbols for the first UCI is not equal to the defined number of symbols for the second UCI.

Aspect 12: The method of Aspect 10, wherein the first uplink control channel resource and the second uplink control channel resource are associated with an uplink control channel format, and further comprising: receiving, from the base station, a radio resource control configuration indicating a starting resource block and a maximum number of available resource blocks associated with the uplink control channel format.

Aspect 13: The method of Aspect 12, further comprising: determining the first quantity of resource blocks and the second quantity of resource blocks based at least in part on one or more of a payload size, a radio resource control configured uplink control channel code rate, a number of symbols available for the uplink control channel format, or a number of symbols available in the first uplink control channel resource or the second uplink control channel resource.

Aspect 14: The method of Aspect 10, wherein the first uplink control channel resource is associated with a first uplink control channel format and the second uplink control channel resource is associated with a second uplink control channel format.

Aspect 15: The method of any of Aspects 8 through 14, further comprising: receiving, from the base station, an uplink control channel configuration indicating an uplink control channel resource associated with an uplink control channel format, wherein the uplink control channel resource is configured with a defined number of symbols, and wherein a first portion of the defined number of symbols are associated with the first UCI and a second portion of the defined number of symbols are associated with the second UCI, wherein receiving the uplink control channel configuration comprises receiving one or more of the first portion of the defined number of symbols or the second portion of the defined number of symbols via downlink control information, a radio resource control message, or a medium access control-control element.

Aspect 16: The method of any of Aspects 8 through 15, wherein the first quantity of resource blocks in the slot is separated in the time domain from the second quantity of resource blocks in the slot using time division multiplexing.

Aspect 17: The method of any of Aspects 8 through 16, further comprising: determining the first quantity of resource blocks and the second quantity of resource blocks based at least in part on the second UCI, wherein the second UCI is associated with an increased number of bits as compared to the first UCI.

Aspect 18: The method of any of Aspects 8 through 17, wherein the first quantity of resource blocks is equal to the second quantity of resource blocks to align a transmit power between the first UCI stage and the second UCI stage.

Aspect 19: An apparatus for wireless communication at a device, comprising a processor; memory coupled with the processor; and instructions stored in the memory and executable by the processor to cause the apparatus to perform the method of one or more of Aspects 1-7.

Aspect 20: A device for wireless communication, comprising a memory and one or more processors coupled to the memory, the one or more processors configured to perform the method of one or more of Aspects 1-7.

Aspect 21: An apparatus for wireless communication, comprising at least one means for performing the method of one or more of Aspects 1-7.

Aspect 22: A non-transitory computer-readable medium storing code for wireless communication, the code comprising instructions executable by a processor to perform the method of one or more of Aspects 1-7.

Aspect 23: A non-transitory computer-readable medium storing a set of instructions for wireless communication, the set of instructions comprising one or more instructions that, when executed by one or more processors of a device, cause the device to perform the method of one or more of Aspects 1-7.

Aspect 19: An apparatus for wireless communication at a device, comprising a processor; memory coupled with the processor; and instructions stored in the memory and executable by the processor to cause the apparatus to perform the method of one or more of Aspects 8-18.

Aspect 20: A device for wireless communication, comprising a memory and one or more processors coupled to the memory, the one or more processors configured to perform the method of one or more of Aspects 8-18.

Aspect 21: An apparatus for wireless communication, comprising at least one means for performing the method of one or more of Aspects 8-18.

Aspect 22: A non-transitory computer-readable medium storing code for wireless communication, the code comprising instructions executable by a processor to perform the method of one or more of Aspects 8-18.

Aspect 23: A non-transitory computer-readable medium storing a set of instructions for wireless communication, the set of instructions comprising one or more instructions that, when executed by one or more processors of a device, cause the device to perform the method of one or more of Aspects 8-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station, comprising:
transmitting, from the mobile station to a network node using a first set of sequences, first uplink control information (UCI) associated with a first UCI stage; and
transmitting, from the mobile station to the network node using a second set of sequences orthogonal to the first set of sequences, second UCI associated with a second UCI stage, wherein both the first UCI stage and the second UCI stage are transmitted using a same slot and a same time-frequency resource in the same slot.

2. The method of claim 1, wherein the first UCI is associated with a first transmit power and the second UCI is associated with a second transmit power.

3. The method of claim 2, wherein the first transmit power is greater than the second transmit power, and wherein the first UCI is associated with an increased priority level as compared to the second UCI.

4. The method of claim 2, further comprising:
receiving, from the network node, downlink control information that includes power boosting information; and
applying the first transmit power to the first UCI and the second transmit power to the second UCI based at least in part on the power boosting information.

5. The method of claim 1, wherein the first UCI includes an acknowledgement or a negative acknowledgement, and the second UCI includes channel state information.

6. The method of claim 1, wherein:
transmitting the first UCI comprises transmitting the first UCI using the first set of sequences and a first orthogonal cover code (OCC); and
transmitting the second UCI comprises transmitting the second UCI using the second set of sequences and a second OCC.

7. An apparatus for wireless communication at a mobile station, comprising:
one or more memories; and
one or more processors, based at least in part on information stored in the one or more memories, configured to:
transmit, from the mobile station to a network node using a first set of sequences, first uplink control information (UCI) associated with a first UCI stage; and
transmit, from the mobile station to the network node using a second set of sequences orthogonal to the first set of sequences, second UCI associated with a second UCI stage, wherein both the first UCI stage and the second UCI stage are transmitted using a same slot and a same time-frequency resource in the same slot.

8. The apparatus of claim 7, wherein the first UCI is associated with a first transmit power and the second UCI is associated with a second transmit power.

9. The apparatus of claim 8, wherein the one or more processors are further configured to:
receive, from the network node, downlink control information that includes power boosting information; and
apply the first transmit power to the first UCI and the second transmit power to the second UCI based at least in part on the power boosting information.

10. The apparatus of claim 7, wherein the first UCI includes an acknowledgement or a negative acknowledgement, and the second UCI includes channel state information.

11. The apparatus of claim 7, wherein:
the one or more processors, to transmit the first UCI, are configured to transmit the first UCI using the first set of sequences and a first orthogonal cover code (OCC); and
the one or more processors, to transmit the second UCI, are configured to transmit the second UCI using the second set of sequences and a second OCC.

12. The method of claim 1, wherein the first set of sequences is associated with a first encoding scheme, and wherein the second set of sequences is associated with a second encoding scheme different form the first encoding scheme.

13. The method of claim 4, wherein the power boosting information includes a beta value that indicates a level of power boosting.

14. The apparatus of claim 8, wherein the first transmit power is greater than the second transmit power, and wherein the first UCI is associated with an increased priority level as compared to the second UCI.

15. The apparatus of claim 8, wherein the first set of sequences is associated with a first encoding scheme, and wherein the second set of sequences is associated with a second encoding scheme different form the first encoding scheme.

16. The apparatus of claim 9, wherein the power boosting information includes a beta value that indicates a level of power boosting.

17. A non-transitory computer-readable medium storing a set of instructions for wireless communication, the set of instructions comprising:
  one or more instructions that, when executed by one or more processors of an apparatus at a mobile station, cause the mobile station to:
    transmit, to a network node using a first set of sequences, first uplink control information (UCI) associated with a first UCI stage; and
    transmit, to the network node using a second set of sequences orthogonal to the first set of sequences, second UCI associated with a second UCI stage, wherein both the first UCI stage and the second UCI stage are transmitted using a same slot and a same time-frequency resource in the same slot.

18. The non-transitory computer-readable medium of claim 17, wherein the first UCI is associated with a first transmit power and the second UCI is associated with a second transmit power.

19. The non-transitory computer-readable medium of claim 18, wherein the first transmit power is greater than the second transmit power, and wherein the first UCI is associated with an increased priority level as compared to the second UCI.

20. The non-transitory computer-readable medium of claim 18, wherein the one or more instructions further cause the mobile station to:
  receive, from the network node, downlink control information that includes power boosting information; and
  apply the first transmit power to the first UCI and the second transmit power to the second UCI based at least in part on the power boosting information.

21. The non-transitory computer-readable medium of claim 20, wherein the power boosting information includes a beta value that indicates a level of power boosting.

22. The non-transitory computer-readable medium of claim 17, wherein the first UCI includes an acknowledgement or a negative acknowledgement, and the second UCI includes channel state information.

23. The non-transitory computer-readable medium of claim 17, wherein:
  transmit the first UCI comprises transmitting the first UCI using the first set of sequences and a first orthogonal cover code (OCC); and
  transmit the second UCI comprises transmitting the second UCI using the second set of sequences and a second OCC.

24. The non-transitory computer-readable medium of claim 17, wherein the first set of sequences is associated with a first encoding scheme, and wherein the second set of sequences is associated with a second encoding scheme different form the first encoding scheme.

* * * * *